(12) United States Patent
Tysor et al.

(10) Patent No.: US 11,973,867 B2
(45) Date of Patent: *Apr. 30, 2024

(54) ENCRYPTED SEARCH

(71) Applicant: Atakama LLC, New York, NY (US)

(72) Inventors: Joseph Oren Tysor, New York City, NY (US); Erik A. Aronesty, New York, NY (US); Michael Krebs, New York City, NY (US); Daniel Gallancy, Accord, NY (US)

(73) Assignee: Atakama LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,246

(22) Filed: Jun. 29, 2023

(65) Prior Publication Data

US 2023/0344631 A1    Oct. 26, 2023

Related U.S. Application Data

(63) Continuation of application No. 17/677,137, filed on Feb. 22, 2022, now Pat. No. 11,743,043, which is a
(Continued)

(51) Int. Cl.
| | |
|---|---|
| *H04L 29/06* | (2006.01) |
| *G06F 16/901* | (2019.01) |
| *G06F 16/903* | (2019.01) |
| *G06F 16/9035* | (2019.01) |
| *G06F 16/9038* | (2019.01) |

(Continued)

(52) U.S. Cl.
CPC .......... *H04L 9/3066* (2013.01); *G06F 16/901* (2019.01); *G06F 16/90335* (2019.01); *G06F 16/9035* (2019.01); *G06F 16/9038* (2019.01); *G06F 16/93* (2019.01);
(Continued)

(58) Field of Classification Search
None
See application file for complete search history.

(56) References Cited

U.S. PATENT DOCUMENTS

| | | | |
|---|---|---|---|
| 11,296,879 B2 | 4/2022 | Tysor et al. | |
| 2003/0041110 A1* | 2/2003 | Wenocur | H04L 65/80 709/206 |

(Continued)

FOREIGN PATENT DOCUMENTS

| | | |
|---|---|---|
| EP | 2606604 A1 | 6/2013 |
| EP | 2947812 A1 | 11/2015 |

(Continued)

*Primary Examiner* — Andrew J Steinle
(74) *Attorney, Agent, or Firm* — Schwegman Lundberg & Woessner, P.A.

(57) ABSTRACT

A method comprises: tokenizing, at a first device, a search query; creating search requests and send to delegate devices, each search request including a public key encrypted message containing the tokenized search query and index identifiers of indices to be searched; computing search responses to the search requests, each search response comprising a partial trapdoor computed per token per identifier; transmitting the search responses to the first device; recombining, at the first device, the search responses per identifier per token; performing a ranked set of queries against the indices; and returning the search results in order of relevancy.

19 Claims, 15 Drawing Sheets

Related U.S. Application Data continuation of application No. 17/063,049, filed on Oct. 5, 2020, now Pat. No. 11,296,879.

(60) Provisional application No. 62/912,779, filed on Oct. 9, 2019, provisional application No. 62/910,554, filed on Oct. 4, 2019.

(51) Int. Cl.
*G06F 16/93* (2019.01)
*G06F 21/62* (2013.01)
*H04L 9/06* (2006.01)
*H04L 9/08* (2006.01)
*H04L 9/30* (2006.01)

(52) U.S. Cl.
CPC ........ *G06F 21/6227* (2013.01); *H04L 9/0662* (2013.01); *H04L 9/0825* (2013.01); *H04L 9/085* (2013.01)

(56) References Cited

U.S. PATENT DOCUMENTS

| | | |
|---|---|---|
| 2009/0214030 A1* | 8/2009 | Price, III ............... H04L 9/085 380/279 |
| 2015/0288520 A1 | 10/2015 | Jacobson et al. |
| 2016/0140179 A1 | 5/2016 | Yuen |
| 2016/0191509 A1* | 6/2016 | Bestler ............... H04L 63/0876 713/193 |
| 2018/0357434 A1 | 12/2018 | Roy |
| 2019/0121873 A1 | 4/2019 | Woodworth et al. |
| 2019/0288840 A1 | 9/2019 | Gallancy et al. |
| 2019/0318356 A1 | 10/2019 | Martin et al. |
| 2021/0105138 A1 | 4/2021 | Tysor et al. |
| 2022/0182235 A1 | 6/2022 | Tysor et al. |

FOREIGN PATENT DOCUMENTS

| | | |
|---|---|---|
| WO | WO-2019209893 A1 * | 10/2019 |
| WO | WO-2019209893 A1 | 10/2019 |

* cited by examiner

ENCRYPTED SEARCH

CROSS-REFERENCE TO RELATED APPLICATION

This application is a continuation of U.S. patent application Ser. No. 17/677,137, filed Feb. 22, 2022, which application is a continuation of U.S. patent application Ser. No. 17/063,049, filed Oct. 5, 2020, issued on Apr. 5, 2022 as U.S. Pat. No. 11,296,879 which application claims the benefit of priority of U.S. provisional patent application No. 62/910, 554 filed on Oct. 4, 2019, and titled "Encrypted Search System," and U.S. provisional patent application No. 62/912,779 filed on Oct. 9, 2019, and titled "Encrypted Search System," the contents of all which are incorporated by reference herein in their entireties.

TECHNICAL FIELD

The disclosed teachings generally relate to data encryption and/or decryption. The disclosed teachings more particularly relate to searching encrypted data without decrypting the encrypted data, thereby improving security of the data.

BACKGROUND

Conventionally, encrypted files cannot be searched without first decrypting them thereby incurring processing usage and potentially sacrificing computer security.

SUMMARY

Embodiments provide a method, computing device that can execute the method and a computer-readable storage device having instructions for executing the method. The embodiments may enable reducing processing usage while maintaining computer security. A first method comprises: tokenizing a document; generating an index key; sharding the index key; encrypting the index key shards with public keys of a plurality of devices; distributing the encrypted shards; constructing a secure index using the tokenized document and the key, the constructing comprising generating a trapdoor by hashing a token into an elliptic curve group and performing a point multiplication of the group by an integer representation of the index key; and storing the secure index in a memory device.

Another method comprises: tokenizing, at a first device, a search query; creating search requests and send to delegate devices, each search request including a public key encrypted message containing the tokenized search query and index identifiers of indices to be searched; computing search responses to the search requests, each search response comprising a partial trapdoor computed per token per identifier; transmitting the search responses to the first device; recombining, at the first device, the search responses per identifier per token; performing a ranked set of queries against the indices; and returning the search results in order of relevancy.

This Summary is provided to introduce a selection of concepts in a simplified form that is further described below in the Detailed Description. This Summary is not intended to identify key features or essential features of the embodied subject matter, nor is it intended to be used to limit the scope of the embodied subject matter. Other aspects of the disclosed embodiments will be apparent from the accompanying Figures and Detailed Description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
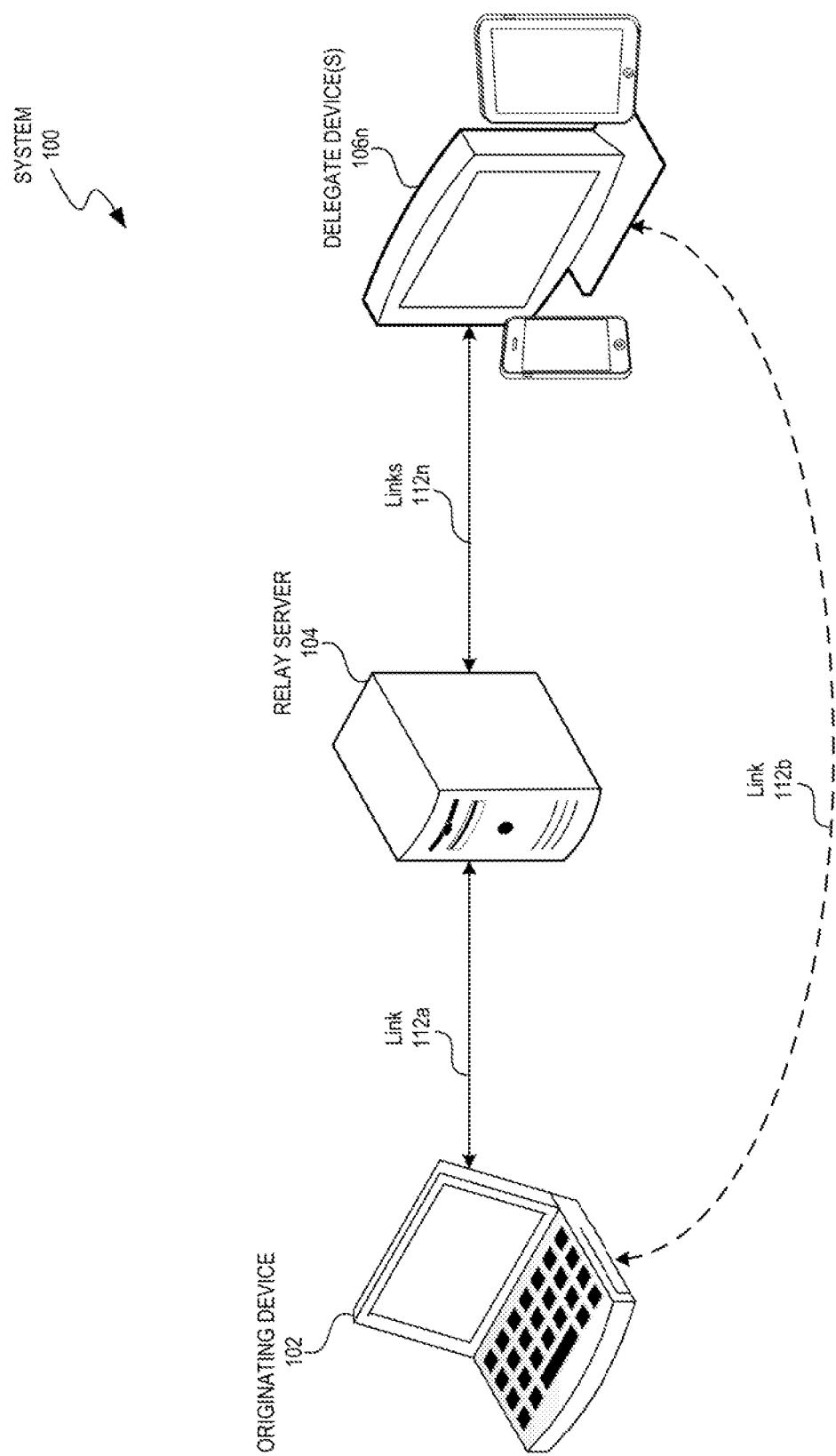
FIG. 1 is a block diagram that illustrates a system for implementing passwordless encryption of data-at-rest according to some embodiments of the present disclosure.

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

Terms such as "processing," "computing," "calculating," "determining," "displaying," "generating" or the like, unless specifically stated otherwise, may refer to actions and processes of a computing device that manipulates and transforms data represented as physical (electronic) quantities within the computer's memory or registers into other data similarly represented as physical quantities within the computer's memory, registers, or other such storage medium, transmission, or display devices.

The terms "connected," "coupled," or variants thereof, as used herein, may refer to any connection or coupling, either direct or indirect, between two or more elements. The coupling or connection between the elements can be physical, logical, or a combination thereof.

The terms "channel" or "link" contemplate a means of communicating data or information, whether wired or wireless, and may utilize digital cellular transmission standards (e.g., CDMA, W-CDMA, LTE, HSPA+). Examples include BLUETOOTH, WI-FI Ethernet, USB, USB-C, Thunderbolt, auditory link, or visual link (e.g., QR code and camera). A message may be communicated directly between two devices or indirectly through another device (e.g., a relay device) on one or more channels/links.

The term "target data," as used herein, may refer to data targeted for encryption. Examples of target data may include photos, documents, spreadsheets, audio files, video files, or any type of encryptable data files. Other examples include data stored in database tables, passwords, emails stored on a computer, or any data object.

The disclosed embodiments include techniques for securing data stored on a memory of a computing device. In some embodiments, a method includes encrypting data stored on a memory of a computing device with a block cipher using cryptographic key(s). Several key shards can be generated based on any of the cryptographic key(s) via a threshold cryptography data-sharing scheme. In some embodiments, each key shard of a cryptographic key can be encrypted with its own unique public key. An encrypted shard can be distributed to one of an array of physically distinct computing devices, which can each have a private key for its encrypted key shard. The cryptographic key can be reconstituted with a threshold number of computing devices that utilize their private keys to decrypt their respective key shards. Specifically, the threshold number of decrypted key shards can be used to reconstitute the cryptographic key, which can then be used to decrypt the encrypted data.

In conventional systems, a significant portion of data-at-rest that is stored at a computing device is not encrypted by default because of the challenges associated with password and cryptographic key management. Maintaining a sufficient quantity of unique keys and passwords to adequately secure all target data is challenging in any system, from consumer-grade to enterprise level. Home and enterprise users need access to hundreds or even thousands of individual data objects on a regular basis, and are unable to memorize or adequately keep track of many high-entropy passwords that would be required to secure target data. Accordingly, users are reluctant to embrace additional passwords for data encryption because they are already inundated with passwords for different sites, services, and apps.

A solution to securing large volumes of data-at-rest includes using a single master password as a key to decrypt numerous data objects stored in a container (e.g., a folder) stored in memory. This type of data security system is vulnerable to attack and, if compromised, will expose the numerous data objects with the single master password. For example, password manager tools such as DASHLANE and LASTPASS utilize a single password which, if compromised, would provide an attacker with access to all the data encrypted with that single password. The risk grows exponentially due to increased efforts in computer hacking and the proliferation of viruses, malware, and ransomware developed by bad actors to exploit vulnerabilities of existing key and password management tools.

Securing data-at-rest is complicated by the risk of losing keys or passwords. Unfortunately, users have grown accustomed to password retrieval mechanisms of websites such that they expect the ability to reset lost passwords that secure their data-at-rest. For example, when a user loses a password to access data of an enterprise system, the user expects that a network administrator can readily send a reset link or code to facilitate resetting the lost password. However, password resets are not possible in the context of encryption of data-at-rest because a decryption algorithm cannot be performed without access to the key or password. A solution to this problem includes so-called "back doors," which have been utilized to provide emergency access to data when a key or password is lost. However, the back doors create vulnerabilities that can be exploited by bad actors. Due to these limitations, most individual users and enterprises do not encrypt the vast majority of their data-at-rest.

Another solution is full-disk encryption, which has been utilized to provide security for physical loss or theft of hard drives. However, full-disk encryption does not protect against computer viruses, malware, ransomware or hackers who are able to gain control of a system. In an enterprise, if data-at-rest is encrypted, central management of encryption keys is often utilized to enable recovery of data when passwords are misplaced, lost, or forgotten. However, a centralized system creates a vulnerability as a treasure-trove of keys for attackers. In addition, full-disk encryption does not protect user data (e.g., email) stored on third-party platforms such as remote cloud storage providers.

The disclosed embodiments overcome the drawbacks of conventional systems by enabling the ability to secure large volumes of data-at-rest with "passwordless" encryption. Hence, unlike conventional systems, the disclosed embodiments do not necessarily require a user to undertake the burdensome step of inputting a password to access any data-at-rest. In fact, each data object can be encrypted with a separate unique cryptographic key that users are not required to explicitly store, memorize, manage, and safeguard to later decrypt any of the encrypted data objects. Instead, the disclosed embodiments require limited and periodic involvement by a user to decrypt any number of data objects while securing each data object with a block cipher using a unique cryptographic key. A "cryptographic key" or "key," as used herein, may refer to a string of bits used by a cipher to transform plain text into cipher text or vice versa. The key remains private and ensures secure storage and communication until the decryption event.

As described in greater detail below, a number of key shards can be generated based on a cryptographic key of a block cipher used to encrypt a data object. In some embodiments, the key shards are derived from the cryptographic key via a threshold cryptography data-sharing scheme. The key shards may be, for example, portions of a cryptographic key that collectively form the cryptographic key such that assembling the key shards would reconstitute the cryptographic key. While embodiments are described herein generally in the context of data-at-rest, files, or data objects in general, those skilled in the art will appreciate that the various embodiments could include implementations for database entries, smartphone files (e.g., image files), emails contained in an inbox (e.g., email on a MS Exchange server or in a Gmail inbox), etc.

The disclosed embodiments can include combinations of hardware and/or software. For example, an embodiment includes a security service that can operate on data stored on a computer storage medium. In another example, an embodiment can include an application distinct from an operating system or file system to separately operate on the data stored in the file system. In yet another example, an embodiment is integrated into an existing file system to provide a simplified interface to users for readily storing an accessing encrypted data-at-rest.

FIG. 1 is a block diagram that illustrates a system for implementing passwordless encryption of data-at-rest according to some embodiments of the present disclosure. As shown, the system 100 includes components such as an originating device 102, a relay server 104, and an array of delegate devices 106n. The originating device 102 can communicate over link 112a with the relay server 104, which can communicate with the delegate devices 106n over links 112n. In some embodiments, the components of the system 100 communicate as part of a security service of the originating device 102. In some embodiments, the originating device 102 and the delegate devices 106n can bypass the relay server 104 to communicate over a link 112b such as, for example, a wireless radio link (e.g., BLUETOOTH) or some other direct or indirect means of communication.

An "originating device," as used herein, is a computing device from which data-at-rest can be accessed. The data-at-rest can be stored at a local memory of the originating device 102 or stored at a remotely located memory of another computing device. In some embodiments, an originating device is a device on which new content is created or preexisting content is modified. In some embodiments, an originating device may be operated as a general-purpose computer running special-purpose software or a special purpose hardware device.

Examples of an originating device include a computer, smart or dumb terminal, a point-of-sale (POS) device, network computer, set-top box, game player, mobile device, wireless device, wireless telephone, personal digital assistant, media (e.g., music and/or video) player, camera, information appliance, workstation, minicomputer, mainframe computer, or any other device that can store or access data-at-rest. Specific examples of an originating device include a desktop computer, laptop computer (e.g., APPLE MACBOOK, LENOVO 440), smartphone (e.g., APPLE IPHONE, SAMSUNG GALAXY, NOKIA LUMINA), tablet computer (e.g., APPLE IPAD, SAMSUNG NOTE, AMAZON FIRE, MICROSOFT SURFACE), or any other computing device that can store or access data-at-rest. Although a single originating device 102 in shown in system 100, the disclosed embodiments can include any number of originating devices.

The originating device 102 can access one or more memories that store data. The memories can include non-volatile memory for storing data-at-rest. For example, the originating device 102 may include or access memory that stores a file system or an email archive. The memories can include volatile memory that stores data-in-use. In some embodiments, the memories include a local storage device and/or cloud-based storage device that can separately or collectively store data objects. The storage devices may be removable or non-removable computer readable storage media such as magnetic hard disk drives, solid-state drives, network-attached storage, flash memory devices, optical drives, remote cloud storage, etc. Other types of storage media that can be used in exemplary operating environments include, but are not limited to, magnetic tape cassettes, flash memory cards, DVDs, digital video tape, solid-state random-access memory (RAM), solid state read-only memory (ROM), etc. The storage media are typically connected to a system bus through a removable or non-removable memory interface.

In some embodiments, a special-purpose software application may be installed on the originating device 102 to practice elements of the disclosed operations, and to facilitate communication with other components of the system 100 including the relay server 104 and the delegate devices 106n. In some embodiments, the originating device 102 may also serve as a delegate device. A distinction between the originating device 102 and the delegate devices 106n is there function in the process of encrypting or decrypting data-at-rest with one or more cryptographic keys. In particular, the originating device 102 can access the encrypted data-at-rest stored in a local or remote memory and the delegate devices 106n can provide respective key shards used to derive the cryptographic key for encrypting or decrypting the data-at-rest stored by the originating device 102. As such, the delegate devices 106n can secure encrypted data-at-rest and authorize decryption of the encrypted data-at-rest by messaging key shards to the originating device 102.

A "delegate device," as used herein, may refer to a computing device on which private keys may be stored and on which key shards of cryptographic keys may be stored. A "key shard," as used herein, may refer to a data item of a threshold number of data items from which a cryptographic key can be reconstituted (e.g., derived). The delegate devices 106n can include any combination of computing devices such as those described herein with respect to the originating device 102.

The delegate devices 106n may include any device that has been configured, via software or hardware, to communicate securely with the originating device 102 (e.g., through the relay server 104) or among the delegate devices 106n. In some embodiments, the delegate devices 106n are portable computing devices (e.g., smartphones, tablet devices, laptop devices) but can further include any device that is accessible to the user and capable of communicating with the originating device 102 or among the delegate devices 106n. Examples include a desktop computer, smart or dumb terminal, a POS device, network computer, set top box, game player, mobile device, wireless device, wireless telephone, personal digital assistant, media player (e.g., music player, video player), camera, information appliance, workstation, minicomputer, mainframe computer, or any other device with similar computing functionality.

The relay server 104 may securely deliver messages and notifications between the originating device 102 and the delegate devices 106n. For example, the relay server 104 may represent any number of server computers that can relay key shards between the originating device 102 and the delegate device 106n over the links 112a-n. The user interface may be used to facilitate management of the encrypted data-at-rest by distributing and collecting key shards among the delegate devices 106n. In some embodiments, the relay server 104 may collect and store the encrypted data provided by the originating device 102 and/or the delegate devices 106, and provide that data to any of the other devices. The relay server 104 may include a combination of hardware and software that is well known to persons skilled in the art and, as such, a description is omitted herein for the sake of brevity.

The links 112a-n may include any combination of private, public, wired, or wireless portions. Any data communicated over the links 112a-n may be encrypted or unencrypted at various locations or along different portions of the links 112a-n. Each component of the system 100 may include combinations of hardware and/or software to process the data, perform functions, communicate over the links 112a-n, and the like. For example, any component of the system 100 may include a processor, memory or storage, a network transceiver, a display, operating system, and application software (e.g., for providing a user interface), and the like. Other components, hardware, and/or software included in the system 100 that are well known to persons skilled in the art are not shown or discussed herein for the sake of brevity.

The ability to communicate over a wireless radio link 112b (e.g., BLUETOOTH, WI-FI) allows the originating device 102 to bypass the relay server 104, to encrypt and decrypt data-at-rest by retrieving key shard(s) directly from delegate device(s). Direct access by the originating device 102 to the delegate devices 106n is useful when any of the links 112a or 112n is down or inaccessible. Communication links, particularly those established between the delegate devices 106n and the originating device 102 may require modifications to the delegate devices or information presented on a mobile device such as a quick response (QR) code. In some embodiments, all communications, regardless of intermediary, are secured by encrypting data with the destination device's public key.

Therefore, the system 100 can implement passwordless encryption of data-at-rest by using a combination of symmetric cryptography, asymmetric cryptography, and threshold cryptography implemented by multiple computing devices. For example, advanced encryption standard (AES) or another cipher can be employed by the originating device 102. In some embodiments, the key shards are fragments of a cryptographic key that are the outputs of a configurable threshold secret-sharing scheme such as Shamir's secret sharing scheme, Blakley's scheme, or Chinese remainder theorem-based secret sharing. In some embodiments, the sharing scheme is operable to represent the cryptographic key with N fragments of which only M are required to reconstitute the original BC cryptographic key. Accordingly, the delegate devices 106n can provide a threshold number of key shards required to reconstruct a cryptographic key. Thus, the originating device 102 can decrypt data by accessing the threshold number of key shards rather than requiring input of the cryptographic key in its entirety.

Figure 2:
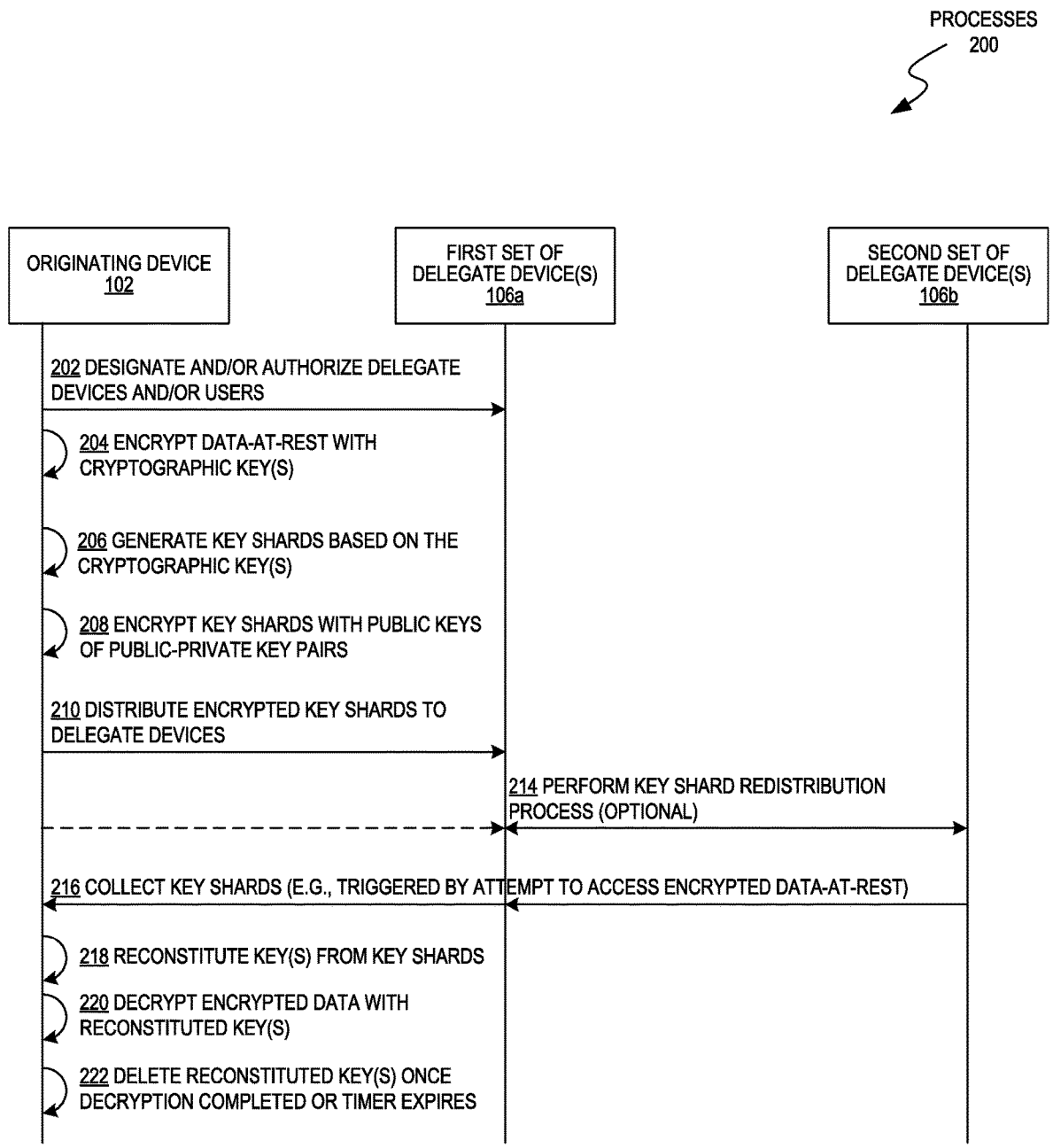
FIG. 2 is a flow diagram that illustrates various processes for passwordless security of data-at-rest according to some embodiments of the present disclosure.

FIG. 2 illustrates various processes of the disclosed passwordless techniques for securing data-at-rest. The disclosed techniques include the use of a combination of symmetric cryptography, asymmetric cryptography, and configurable threshold cryptography to manage encryption and/or decryption of data-at-rest. The processes 200 can be a performed by the originating device 102 and delegate devices 106a-b as part of a security service. The originating device 102 or delegate devices 106a-b can include a variety of different devices such as those discussed with reference to FIG. 1.

The originating device 102 and/or delegate devices 106a-b may belong to a user that is authorized to access and decrypt data objects with the originating device 102. In some instances, at least some of the delegate devices 106a-b may belong to users that are not authorized to access the encrypted data. The memory storing the encrypted data may be a local memory of the originating device 102 and/or a remote memory, and the encrypted data is stored on the local or remote memory.

In step 202, a user of the originating device 102 can designate a set of computing devices as delegate devices 106a or authorize a user of the delegate devices 106a. In some of the embodiments, each of the delegate devices 106a is physically separate from each other and/or could include the originating device 102.

In step 204, the originating device 102 encrypts target data with a cryptographic key. The cryptographic key may be created specifically to encrypt the target data. For example, the cryptographic key may be a string of bits of a symmetric key (e.g., key for a symmetric cipher) for use in a block cipher capable of transforming plain text into cipher text and vice versa. In some embodiments, the cryptographic key is generated temporarily to encrypt data-at-rest and is thereafter deleted.

The target data may include various types of data objects (e.g., image, document, spreadsheet, audio file, video file) that are each encrypted with respective cryptographic keys. Examples include a file system with various files and instructions for encrypting the files, an email archive system with emails and instructions for encrypting the emails, a database system records and instructions for encrypting the messages, etc. The encrypted target data is stored on a non-transitory computer memory that can be accessed by the originating device 102.

In step 206, the originating device 102 generates N key shards based on the cryptographic key. The cryptographic key can be derived (reconstituted) from a necessary and sufficient threshold number M of the N key shards. For example, the set of N key shards can be generated via a threshold cryptography data-sharing scheme. When the user wants to decrypt the encrypted target data, M-of-N key shards are processed to reconstitute the cryptographic key. The set of key shards can be stored locally and/or distributed among the delegate devices 106a-b. As used herein, a "key shard" of a cryptographic key may also be referred to as a component, fragment, or by any other term that indicates a part or element of a set of key shards.

To aid in understanding data-sharing schemes, consider an W order polynomial that could be reconstituted from W+1 points of that polynomial. For example, consider a second order polynomial $aX^2+bX+c$ where the cryptographic key is represented by the constant term c. The polynomial can be reconstituted with any three points of the polynomial. Examples of a sharing scheme include Shamir's Secret Sharing Scheme, Blakley's scheme, secret sharing using the Chinese remainder theorem, or any other sharing scheme understood by persons skilled in the art. In one simple example, a cryptographic key such as the password "secret" can be used to encrypt target data, split into the shards "sec" and "ret," and reassembled later to decrypt the encrypted target data.

Figure 3:
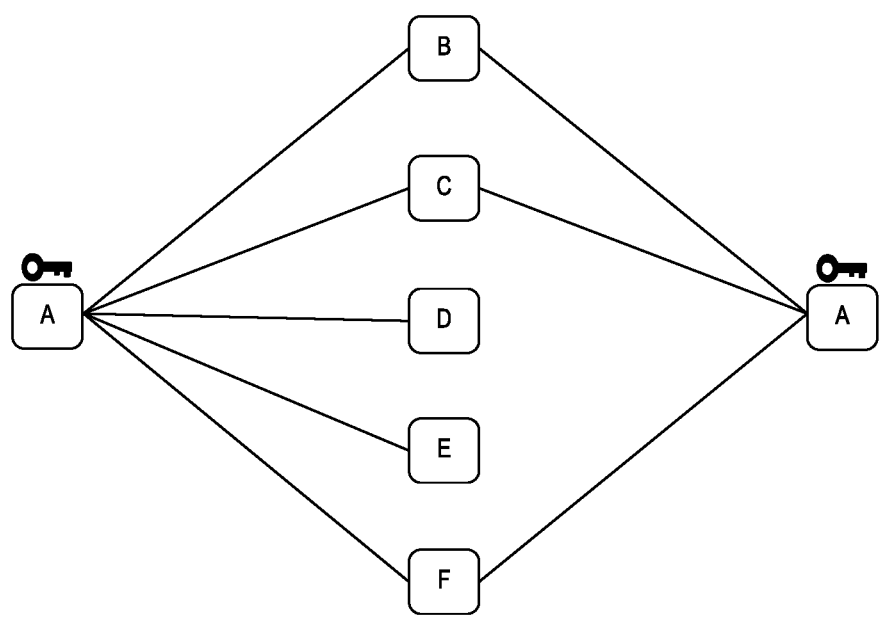
FIG. 3 is a block diagram of an example process for generating key shards, based on a cryptographic key, of which a threshold number can be used to reconstitute a cryptographic key according to some embodiments of the present disclosure.

For example, FIG. 3 is a block diagram of an example process for generating a set of key shards, based on a cryptographic key, of which a threshold number of the key shards can be used to reconstitute a cryptographic key. As shown, device A is an originating device and devices B through F are delegate devices. A set of key shards can be distributed across combinations of the computing devices A, B, C, D, E, and/or F. The illustrated example is of a three-of-five configuration where only three key shards are required to reconstitute the cryptographic key and remaining devices are superfluous. Thus, losing access to any two-of-five computing devices B through F would not prevent the originating device 102 from reconstituting the cryptographic key because the key shards from the remaining computing devices are sufficient to do so. Note, however, that the cryptographic key cannot be reconstituted from a subset of the key shards that is less than the threshold number (e.g., two key shards). The reconstituted cryptographic key can then be used to decrypt or encrypt data.

The disclosed embodiments include an asymmetric key pair that is generated for each delegate device 106a. The key pair includes a delegate public key and a delegate private key. These two keys may be created together using a key generation technique such as RSA or elliptic curve key pairs. The delegate asymmetric key pair may be generated at a delegate device. The delegate private key may be kept exclusively on the delegate device and never shared or exported to another computing device. In contrast, the delegate public key is shared or exported for use by another delegate device or the originating device. In some embodiments, the key shards can be encrypted with the delegate public keys to produce encrypted key shards that can be securely communicated to their delegate devices. The mechanism for encryption and the choice of key strength may be configurable and may include, for example, RSA, ECIES, ElGamal and other encryption schemes with similar functionality.

Each delegate device may generate a delegate key pair including a delegate private key and delegate public key. Each delegate device can retain its respective delegate private key. For example, delegate device D1 could retain private key K-1, delegate device D2 could retain private key K-2, and so on. Each of the N delegate devices may also distribute its delegate public key to any other delegate device and each originating device such that all delegate devices and originating devices have all the delegate public keys and originating device public keys.

A backup key pair may be generated with a backup public key distributed to the various originating devices as well. The decision whether to generate a backup public key may depend on user or administrator preference. Hence, the disclosed embodiments may employ other key pairs that improve security. For example, an embodiment may employ a backup asymmetric key pair, which includes a backup public key and a backup private key. These backup key pairs may be generated by a computing device when offline by using a key generation technique such as RSA or elliptic curve key generation. The backup private key can be kept on the offline computer while the backup public key can be exported for use by other computing devices.

In step 208, each of the N key shard is encrypted with one of N public keys associated with a respective delegate device to create N encrypted key shards. In addition, any metadata associated with the original data is authenticated, for example via MAC or by including the metadata in the shard. The originating device 102 may have access to all the public keys of the delegate devices 106a such that the originating device 102 can use the public keys to encrypt the key shards for respective delegate devices 106a. The delegate devices 106a hold respective counterpart private keys that can be uses to decrypt their respective key shards as needed.

In some embodiments, the cryptographic key is optionally encrypted using a backup public key to create an encrypted cryptographic key that can be decrypted using a backup private key. The backup keys are generally created and stored in an offline environment. For example, a file system (FS) can encrypt the target data by using the cryptographic key. The FS can store the encrypted key shards with the encrypted target data in an archive file on disk. In addition, if a backup public key was created, it may be used to encrypt the cryptographic key, which may then be added to the archive file.

Figure 4:
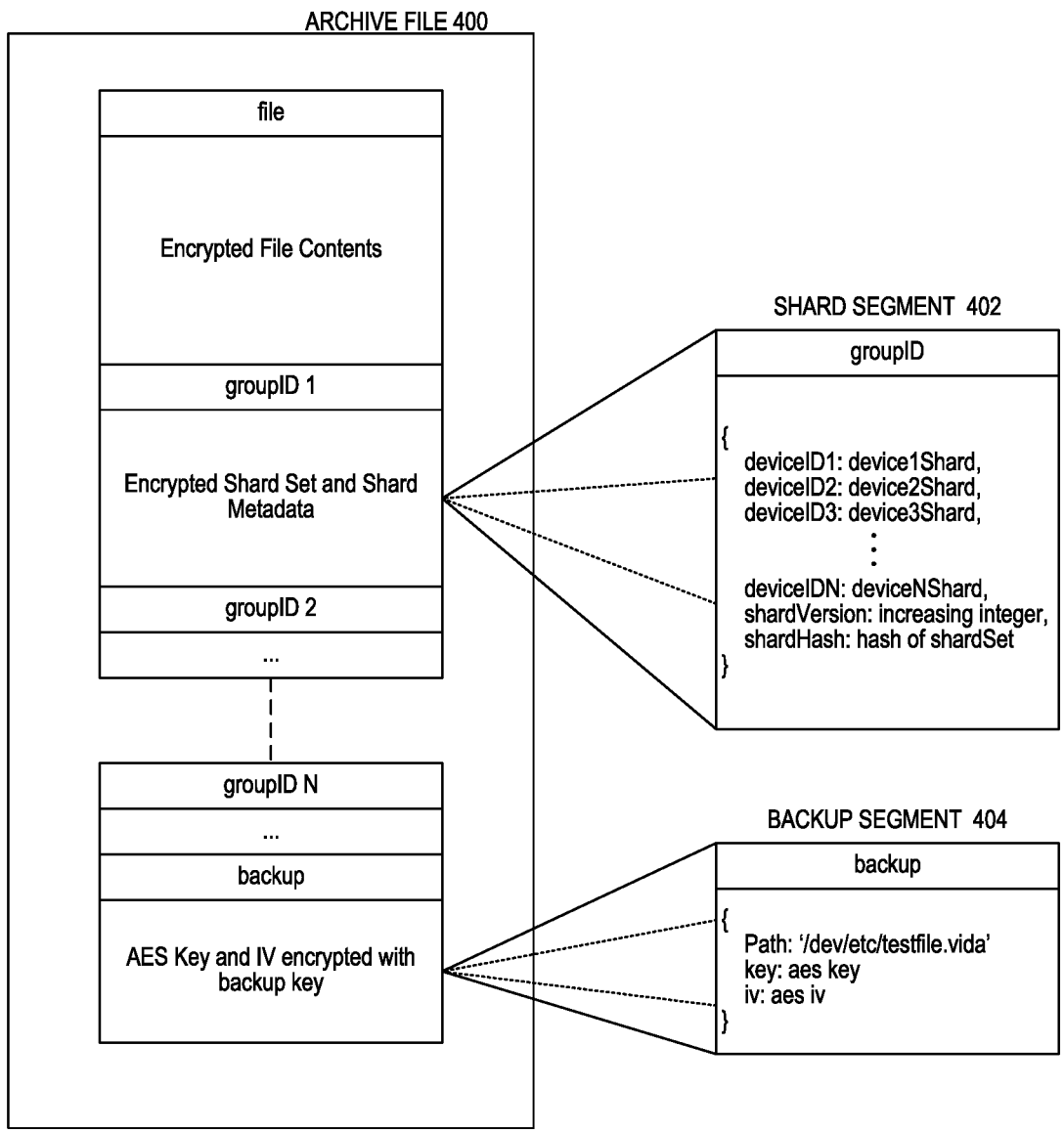
FIG. 4 is a block diagram illustrating an archive file according to some embodiments of the present disclosure.

An "archive file," as used herein, is a customized file format in which target data that has been encrypted with, for example, a BC using a cryptographic key may be stored together with any combination of encrypted versions of the cryptographic key (or related keys), encrypted key shards, or encrypted key sub-key shards. For example, FIG. 4 is a block diagram that depicts an archive file 400 according to some embodiments of the present disclosure. The archive file 400 has a file structure including a shard segment 402, and backup segment 404.

As shown, the archive file 400 may include an entire cryptographic key that has been encrypted with a backup public key or another asymmetric encryption technique. Hence, decryption of an archive file may require additional cryptographic information to produce a decrypted version of the cryptographic key. In some instances, additional sets of encrypted key shards are added in the archive file. The additional sets of encrypted key shards may be used to open files. With the encrypted key shards added to the archive file, the encryption process is complete. In some embodiments, at least some of the encrypted key shards are optionally sent to the delegate devices 106a to further improve security. Optionally distributing the N encrypted key shards to the delegate devices 106a reduces the network traffic required to decrypt data and redistribute shards. Encrypted target data is recoverable with the key shards stored at the delegate devices 106a.

For example, in step 210 of FIG. 2, the N encrypted key shards are distributed among the first set of delegate devices 106a such that the originating device 102 is incapable of decrypting the encrypted target data due to an absence of a cryptographic key and the keys shards from which the cryptographic key can be reconstituted. For example, the originating device can communicate with a relay server to distribute the shards among the delegate devices 106a.

In some embodiments, distributing the N encrypted key shards involves establishing a wireless link (e.g., WI-FI, BLUETOOTH, cellular), a wired link (e.g., Ethernet, USB), visual link, or auditory link between the originating device 102 and the delegate devices 106a. For example, at least one of the N key shards can be communicated over a computer network to at least one of the set of delegate devices 106a that are remotely located from the originating device 102. In another example, at least one of the N key shards is communicated over a short-range radio link to at least one of the set of delegate devices 106a that is located remote from the originating device 102. The delegate devices 106a may be temporarily or intermittently coupled to the originating device 102 to communicate the key shards.

In some embodiments, a local security service can extract a set of encrypted key shards from an archive file. The originating device 102 may pass the set of encrypted key shards to a communication service, which distributes the encrypted shards to respective delegate devices. Communication among the delegate devices 106a may be direct (e.g., on the same LAN, via BLUETOOTH or Ethernet connection) or via a relay server or onion routing scheme.

Key Shard Redistribution Process

The disclosed embodiments include a key shard redistribution process to replace or add a delegate device to an existing set of delegate devices. If an existing delegate device is lost, stolen, destroyed, rendered obsolete, or is otherwise inaccessible, it can be replaced with another delegate device according to the redistribution process. In some embodiments, the threshold number of key shards required to reconstitute a cryptographic key may be the same or different from the threshold number of key shards required for the redistribution process. Moreover, the redistribution process can be used to change the threshold number of devices required to reconstitute a cryptographic key.

In step 214, the optional redistribution process is performed to generate a second set of key shards based on a combination of the first set of key shards. The second set of key shards is generated from a first threshold number of the first set of key shards, and may include some or none of the first set of key shards. The number of the second set of key shards may be the same or different than the first set of key shards. The cryptographic key is capable of being reconstituted from either the first set of key shards or the second set of key shards. Further, the second set of key shards may be generated without ever reconstituting the cryptographic key.

In some embodiments, the redistribution process involves generating intermediary sub-key shards from the first set of key shards, and then generating the second set of key shards from the sub-key shards. The sub-key shards are distributed among the second combination of devices that can generate the second set of key shards based on the sub-key shards. As such, a type and number of the first set of delegate devices that holds the first set of key shards can change to a second set of delegate devices that holds the second set of key shards. Hence, the second combination of delegate devices may include some or none of the first combination of delegate devices.

Figure 5:
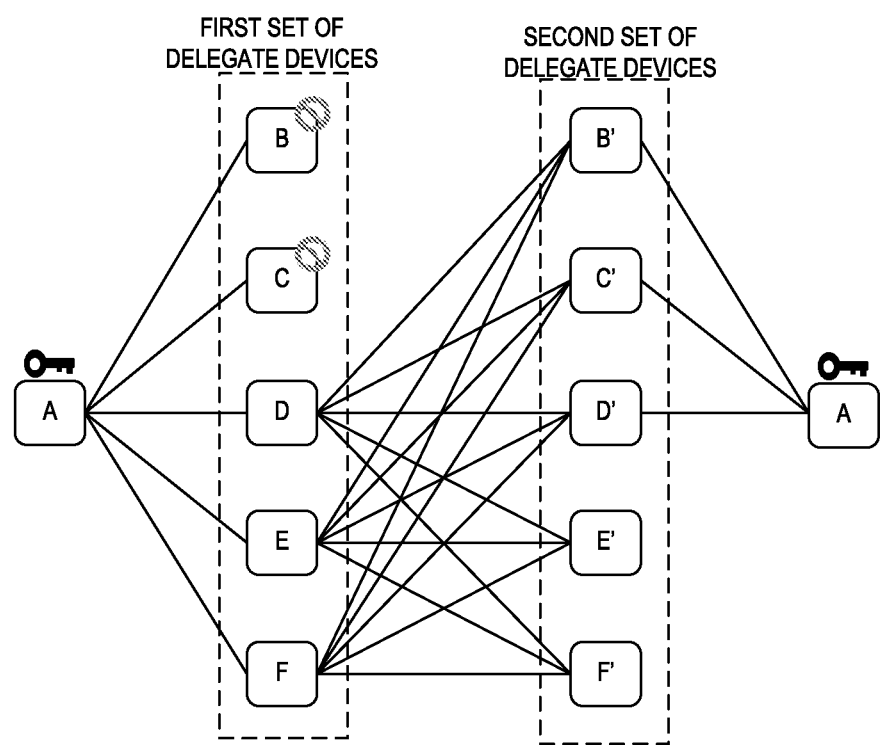
FIG. 5 is a block diagram of an example key shard redistribution process according to some embodiments of the present disclosure.

FIG. 5 is a block diagram that illustrates an example process for generating new key shards from a threshold number of existing key shards such that a cryptographic key can be reconstituted from a new threshold number of the new key shards according to some embodiments of the present disclosure. In the illustrated example, a three-of-five configuration is required to perform the redistribution process and to reconstitute the cryptographic key. That is, only three key shards are required to replace any number of the first set of delegate devices and only three new key shards are required to reconstitute the cryptographic key.

The redistribution process requires decrypting only a threshold number of encrypted key shards. The threshold number of unencrypted key shards may be made available from the archive file or from the respective delegate devices on which they reside. The threshold number of unencrypted shards are inputs to a redistribution process that produces a new set of unencrypted key shards, which can be encrypted with the private keys of the second set of delegate devices (including any new delegate devices), resulting in more encrypted key shards compared to the original number of key shards. The new encrypted key shards can be added to the archive file of the originating device and may be distributed to additional delegate devices.

As shown, the originating device A generates five key shards based on a cryptographic key, and distributes the five key shards to the first set of delegate devices B through F. The device B is a primary delegate device (e.g., user's smartphone), and the delegate devices C through F are backup delegate devices (e.g., each a tablet computer). Assume that devices B and/or C are lost or otherwise inaccessible. A user can operate a GUI on the originating device A (or a remaining delegate device) to trigger a redistribution process to the new delegate devices B' through F'.

A set of sub-key shards are created as an intermediate step in the process to create the new set of key shards for the second set of delegate devices B' through F'. As used herein, "sub-key shards" may refer to key shards generated based on other key shards and which have been created in accordance with a redistribution process that extends the sharing scheme to create a new set of key shards from a preexisting subset of a threshold number of key shards. Of the new set of key shards, only another threshold number may be required to reconstitute the original cryptographic key. Therefore, the new threshold and new number of key shards need not be the same as the original threshold and original number of key shards, respectively.

As shown, the originating device A works in consort with the delegate devices D, E, and F to produce sub-key shards for the delegate devices B' through F'. The delegate device D will produce sub-key shards D-1 through D-5, the delegate device E will produce sub-key shards E-1 through E-5, and the delegate device F will produce sub-key shards F-1 through F-5. The sub-key shards D-1, E-1, and F-1 are for the new delegate device B'. The sub-key shards D-2, E-2, and F-2 are for the new delegate device C'. The sub-key shards D-3, E-3, and F-3 are for the new delegate device D'. The sub-key shards D-4, E-4, and F-4 are for the new delegate device E', and the sub-key shards D-5, E-5, and F-5 are for the new delegate device F'. The new key shards are derived from the sub-key shards at the respective new delegate devices B' through F'.

Therefore, the new set of delegate devices B' through F' replace the old set of delegate devices B through F. The new key shards may be encrypted with the respective public key of the delegate devices B' through F'. The new encrypted key shards can be added to the archive file of the originating device A, and may be distributed to other remaining delegate devices. Except for the missing shards, the remaining encrypted key shards may be made available at the archive files or at respective delegate devices on which they reside. There is no need to reconstitute the cryptographic key during the redistribution process, nor are three-of-five decrypted shards required at any device during the redistribution process. Instead, the cryptographic key only needs to be reconstituted to decrypt or encrypt target data. Further, a minimum threshold number of delegate devices and respective key shards are needed to reconstitute the cryptographic key. In this instance, three-of-five new key shards are required to reconstitute the cryptographic key.

The ability to limit the need to reconstitute the cryptographic key only to decrypt or encrypt target data improves the security of the target data. For example, needing to reconstitute cryptographic keys for numerous data objects to create new sets of key shards is undesirable because this would create a vulnerability. In particular, a bad actor that knows that a redistribution process will occur because the bad actor stole a delegate device could snoop to capture cryptographic keys for data object during that process. Hence, the embodiments mitigate the risk of this vulnerability by avoiding the need to reconstitute any cryptographic key except to encrypt or decrypt data objects.

Although FIG. 5 illustrates a process for replacing an entire first set of delegate devices with the second set, the redistribution process can be utilized to replace any number of delegate devices, as long as the threshold number of the original delegate devices are available for the redistribution of key shards. Moreover, the redistribution process can be used to add an infinite number of different combinations of delegate devices. For example, consider a situation where the first set of delegate devices only includes D, E, and F. After performing a redistribution process, the second set of delegate devices may include B', C', D, E, and F.

Therefore, the disclosed embodiments include techniques for incorporating other computing devices into a set that stores key shards. This includes adding or replacing selected computing devices to create a new combination of computing devices that store the set of key shards required to reconstitute a cryptographic key from the threshold number of key shards, and then re-sharding the cryptographic key to generate a new set of key shards for a new combination of computing devices.

Decryption Process

In step 216, the decryption process may be invoked when a user of the originating device 102 attempts to open a file, read data from a database, or otherwise access an encrypted data object. For example, a file opening process may be interrupted by a file system (FS) handler or operating system handler, which recognizes the file that contains the encrypted data object. In some embodiments, the originating device 102 collects at least the threshold number of decrypted key shards from the delegate devices 106a and/or 106b. For example, the originating device 102 can cause the delegate device 106a-b to communicate their respective key shards to the originating device 102.

In some embodiments, the delegate devices 106a-b can check with users in possession of respective delegate devices as to whether to permit the decryption event. The request for permission may be presented in a variety of forms such as a text or SMS message, a popup notification, LED display, or other format built-in to the operating system or provided by system software and available hardware. The user may accept the request for a decryption event. In some embodiments, a request is automatically denied after a predetermined period expires.

In an M-of-N configuration, only a threshold M of the total N key shards are required to reconstitute a cryptographic key. Of the N corresponding delegate devices, one or more are primary (i.e., authorizing) devices and the remainder are secondary devices. For example, in a 2-of-3 configuration in which there is a laptop, a smartphone, and a tablet, the laptop could be the originating device, the smartphone could be the primary delegate device, and the tablet could be a delegate secondary device. In this example, reassembly of the cryptographic key requires participation by only two devices: the originating device and the smartphone. Participation by a secondary device is not necessary unless the primary delegate device is unavailable.

In some embodiments, a user in possession of a delegate device may, contingent on the name, type, path or other target data metadata, set a threshold for a number of automatic affirmative responses to requests for decryption. For example, the threshold may be set to automatically decrypt the next 10 shards received or automatically decrypt all shards received during the next 12 hours. If decryption is permitted, the delegate device can decrypt its respective encrypted key shard and return the decrypted key shard to the originating device 102 via a relay server or other communication channel, or can be re-encrypted for transit to the originating device 102. The key shards received by the originating device can be used to reconstitute the cryptographic key, which is delivered to the FS or operating system. The target data may then be decrypted and opened.

In step 218, the originating device 102 reconstitutes a cryptographic key from key shards collected from the originating device 102 and/or the delegate devices 106a-b. In some embodiments, at least some or all of the key shards are required to reconstitute the cryptographic key. Specifically, the cryptographic key is reconstituted from a threshold number of the key shards collected from the originating device 102 and/or the delegate devices 106a-b. Then, in step 220, the originating device decrypts the encrypted target data stored on a non-transitory computer memory with the reconstituted cryptographic key.

In some embodiments, any reconstituted cryptographic keys are enabled for only a period sufficient to decrypt the encrypted data. For example, in step 222, any reconstituted cryptographic keys are automatically deleted after completing decryption of the encrypted target data. In some embodiments, a cryptographic key and any copies of key shards are made inoperable or deleted from the originating device 102 such that any cryptographic key for decrypting the encrypted data is unavailable or underivable except during decryption or encryption of target data.

The disclosed embodiments also include a process for modifying encrypted data. The data that has been encrypted according to the encryption process described herein can be decrypted according to the decryption process described herein. The decrypted data can then be modified, and again encrypted according to the encryption process described herein.

The disclosed embodiments also include a key rotation process. For example, a user or a system may wish to rotate or change the cryptographic keys used for encrypting target data. Key rotation can be accomplished by decrypting the target data by using a first cryptographic key in the decryption process described herein and then re-encrypting the target data by using the encryption process described herein, but with a second cryptographic key that is different from the first cryptographic key.

The originating device may be operating under the control of an operating system that provides a file system, which controls how data is stored and retrieved. In some embodiments, the originating device may be configured to run a virtual file system (VFS), an interface layer or abstraction layer that insulates the application program from the file system implementation, and can provide a common interface to multiple types of file systems. If a VFS is utilized, the VFS can respond to application-level calls for file operations including opening, reading, writing, and appending to files stored on the device. The VFS can also respond to handling encryption events applicable for each file operation. If the originating device is not running a VFS, the originating device's operating system may respond directly to application-level calls for file operations and handling encryption events applicable for each file operation.

Figure 6:
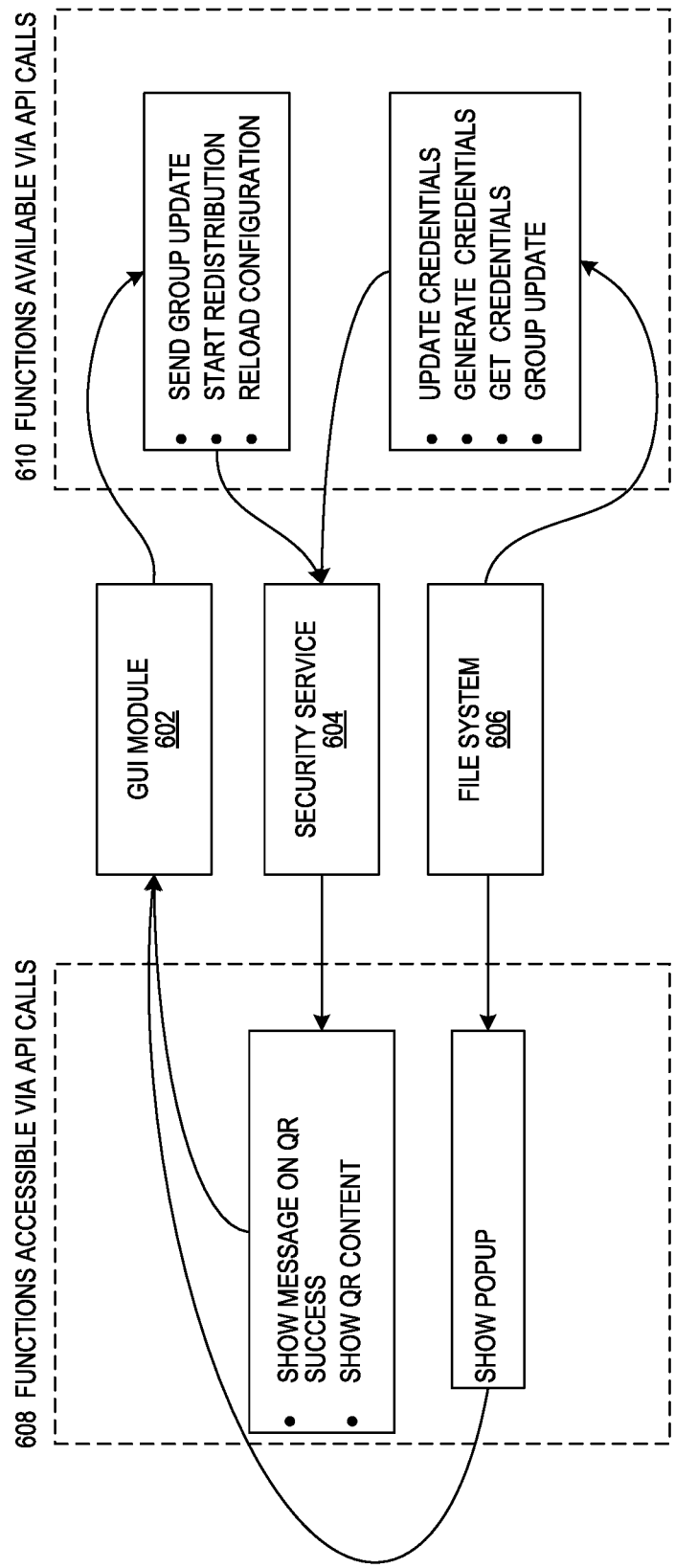
FIG. 6 is a block diagram that illustrates components of an originating device operable to secure data-at-rest according to some embodiments of the present disclosure.

For example, FIG. 6 is a block diagram that illustrates components of an originating device operable to perform at least some of the processes 200. For example, the originating device may include a graphical user interface (GUI) module 602 that facilitates interactions with a user. The originating device may also include a security service 604, a file system 606, and various functions accessible or available via API calls 608 and 610. Tasks such as adding or removing a delegate device, system configuration, controlling alerts, and other features may be managed by a user through the GUI module 602.

In some embodiments, the originating device's security service 604 is a program that runs at an originating device, though it could be running elsewhere such as on a dedicated server. For example, the security service can accept requests from a file system (e.g., virtual file system (VFS), a file system built into the computer's operating system, a customized file system or otherwise) to reconstitute a cryptographic key used to decrypt content of an archive file. In some embodiments, the security service is part of a special-purpose software application installed on the originating device to enable the disclosed cryptographic operations and facilitate communications with a relay server and/or delegate device.

Figure 7:
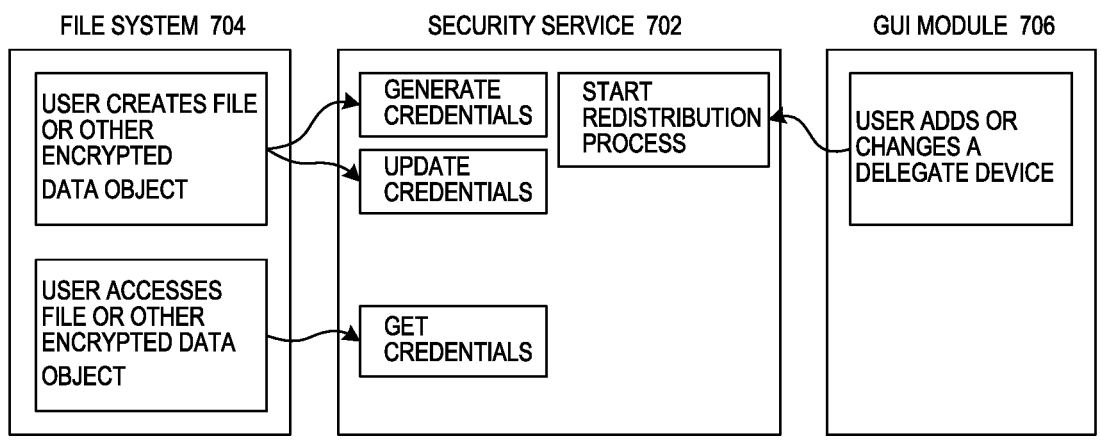
FIG. 7 is a block diagram illustrating a data flow among components of an originating device according to some embodiments of the present disclosure.

FIG. 7 is a block diagram illustrating a data flow among components of an originating device according to some embodiments of the present disclosure. The security service 702 may control communication via a relay network, key storage, and key management. The security service 702 is communicatively coupled to the file system 704 (e.g., VFS) and the GUI module 706. As an example, the security service 702 may communicate messages and notifications across a relay network related to generating, updating, and sharing credentials.

In some embodiments, a cryptographic process starts with a user or a program attempting to open a file located in a file system 704. The file system 704 could appear as a folder within a user's home directory. From the user's perspective, the file system 104 could operate like other folders on the originating device. On the back end, the files within the file system 704 folder are data stored in an encrypted manner within archive files. The user need not be aware of the archive files nor their actual location, which could be in cloud storage, on a file server, or both on the local device with the data mirrored on a cloud server (e.g., DROPBOX, GOOGLE DRIVE).

The file system 704 (as a virtual file system) may manage interactions with the file system of the originating device's storage device. An application programming interface (API) may be provided to permit communications among the modules in the originating device. For example, the file system 704 can communicate with the security service 702 that the file system 704 needs a key to decrypt data in an archive file. The security service 702 then contacts the various delegate devices, retrieves relevant key shards, reconstitutes the cryptographic key, and delivers the reconstituted cryptographic key to the file system 704. The file system 704 can then decrypt the data in the archive file. In some embodiments, the file system 704 will usually pass the relevant encrypted key shards found within the archive file to the security service 702. The security service 702 can then send those encrypted key shards to a relay server for eventual receipt by relevant delegate devices. The relevant delegate devices, using their respective private keys, can decrypt the encrypted key shards, and return unencrypted key shards to the security service 702, which can reconstitute the cryptographic key and return it to the file system 704. The file system 704 can use the reconstituted cryptographic key to decrypt the data stored in the archive file and then present the decrypted data to the relevant program.

In some embodiments, the archive file may not contain certain associated encrypted key shards. The missing key shards could be stored only on delegate devices. Under those circumstances, the security service 702 can instruct delegate devices to produce relevant key shards by using a reference number for the archive file.

The security service 702 may also be responsible for producing new cryptographic keys for the file system 704 (e.g., upon creation of a new file), using a sharing scheme to create key shards, and encrypting those key shards with public keys of respective delegate devices. The encrypted key shards can be sent to the delegate devices, and also sent back to the file system 704 for storage within the archive file.

The security service 702 can also interact with the GUI module 706 to handle with several operations including loss or removal of a delegate device, the replacement or addition of a delegate device, and change the number of either M or N key shards. These operations may require a redistribution of key shards in accordance with the key shard redistribution process described herein.

The security service 702 can interact with the GUI module 706 to process a change in the user's delegate devices for authorization or backup purposes. For example, an implementation may have a 2-of-4 configuration, meaning that at least two of four computing devices that store respective distributed key shards are required to assemble a cryptographic key that enables decryption of target data. The user's computing devices may include a laptop as an originating device, a smartphone as a primary delegate device, a tablet as a backup delegate device, and a friend's smartphone as another backup delegate device. All four devices store respective encrypted key shards and the associated private key required for decryption. Under normal circumstances, the user will only receive decryption requests on the user's primary delegate device, and the originating device will provide decrypted key shards by default. If the battery of the user's primary delegate device (e.g., smartphone) is discharged, the user may wish to switch the duty of the primary delegate device temporarily to the backup delegate device (e.g., tablet). Switching to the backup delegate device would not require a redistribution operation but could require communication via the relay server.

Setup Process

Figure 8:
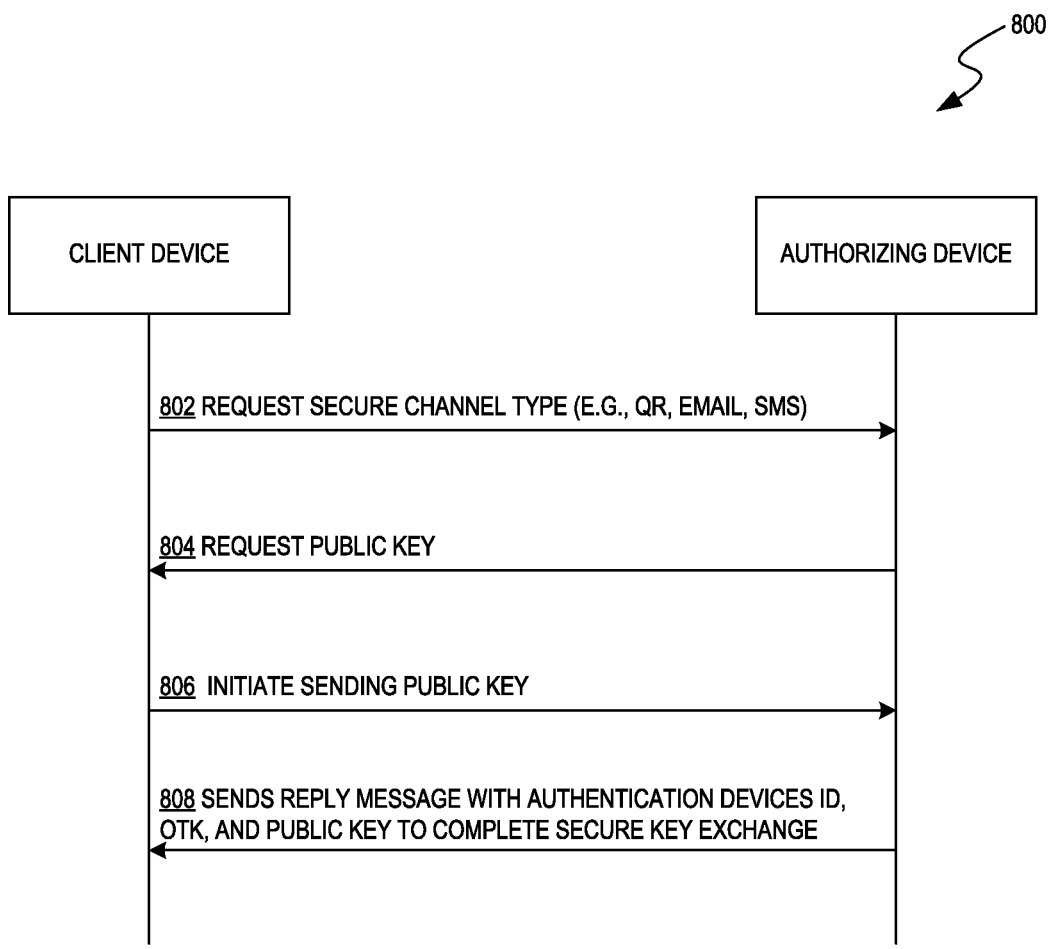
FIG. 8 is a flow diagram that illustrates a secure third-party channel (STPC) device linking according to some embodiments of the present disclosure.

The disclosed embodiments include processes for securely linking devices to exchange data such as key shards. For example, FIG. 8 is a flow diagram illustrating a secure third-party channel (STPC) device linking process 800 according to some embodiments of the present disclosure. More specifically, process 800 implements a secure communication channel for the exchange of public keys.

In step 802, a client device (a first device) can request a secure channel type (e.g., QR, email, SMS) by selecting a channel and then sending its device ID such as, for example, a random 16-byte one time key and a hash of its public key to the authorizing device (a second device). In step 804, the authorizing device requests the client device's public key. In step 806, the client device initiates sending the public key to the authorizing device. Lastly, in step 808, the authorizing device sends a reply message with an authentication device ID, one-time key (OTK), and public key to complete the secure exchange required to establish a secure link between the devices.

Figure 9:
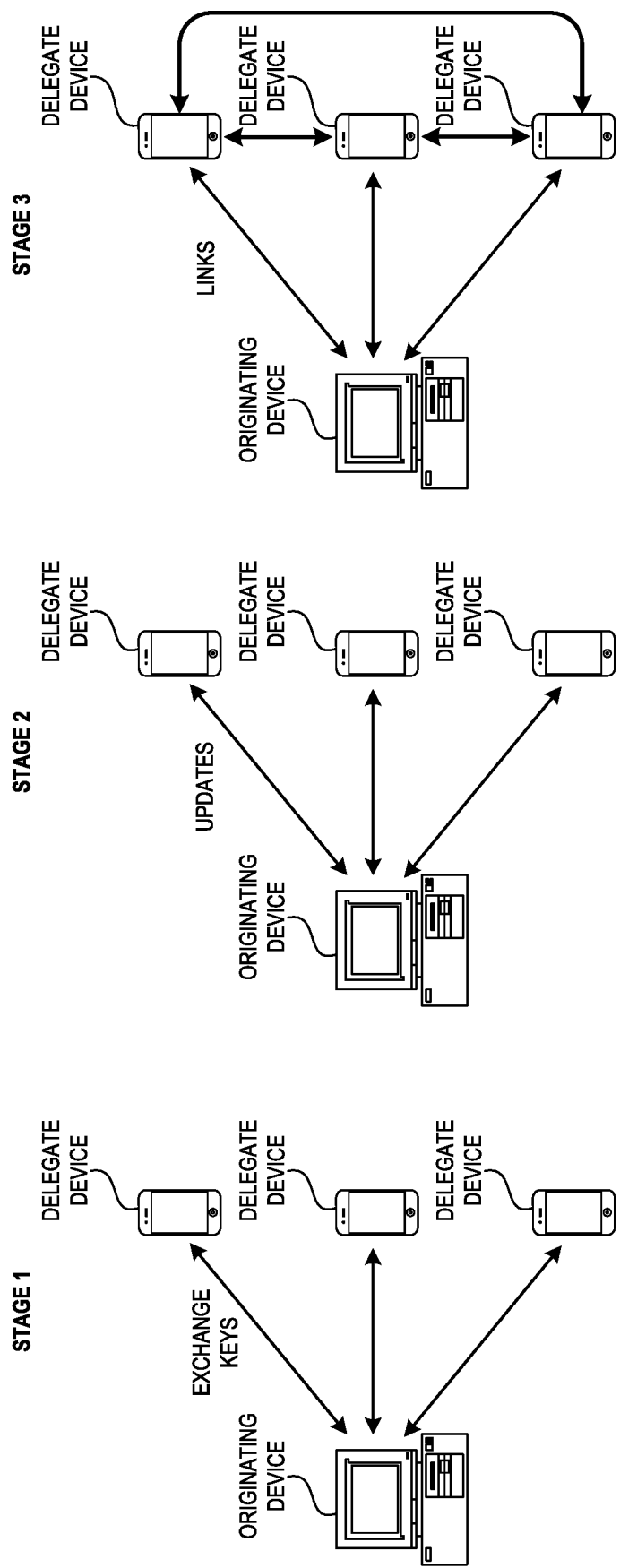
FIG. 9 is a block diagram that illustrates a setup process of onboarding procedures according to some embodiments of the present disclosure.

FIG. 9 is a block diagram that depicts a setup process for onboarding procedures according to some embodiments of the present disclosure. Stage 1 shows that an originating device can perform a secure exchange of public keys with delegate devices via the usage of the STPC mechanism of FIG. 6. All communication after this can be encrypted and signed. Stage 2 shows that after linking with the delegate devices, the originating device can send the full on-boarding information to the delegate devices which will link them to each other in stage 3. The completion illustrated in stage 3 results in all devices exchanging their public keys with each other in a secure manner. The group including the originating device and delegate devices are then ready to securely communicate key shards.

Figure 10:
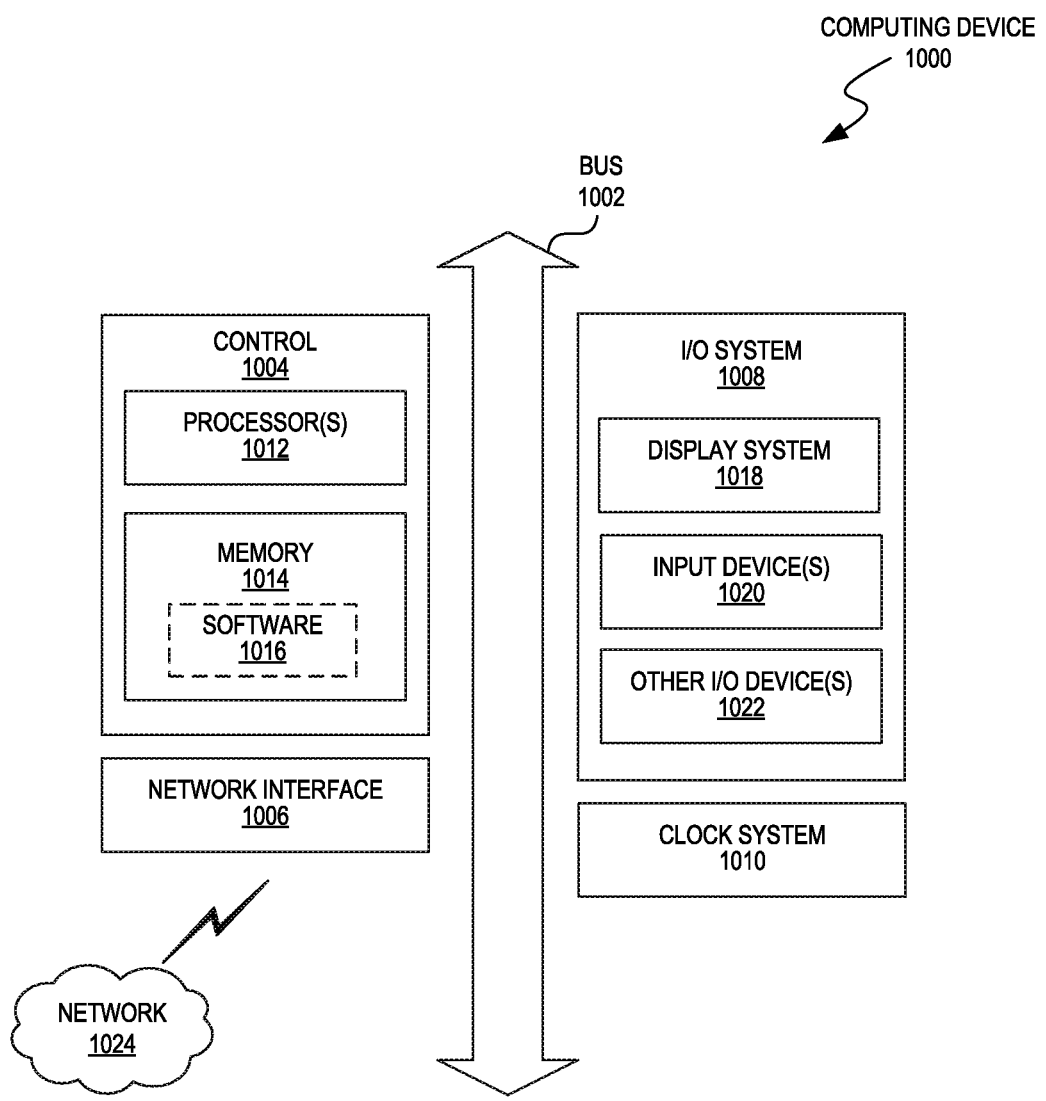
FIG. 10 is a block diagram of a computing device operable to implement aspects of the disclosed embodiments.

FIG. 10 is a block diagram of a computing device 1000 operable to implement aspects of the disclosed embodiments. The computing device 1000 may be a generic computer or specifically designed to carry out features of the system 100. The computing device 1000 may be an originating device, a relay server, or a delegate device embodied as, for example, a system-on-chip (SOC), a single-board computer (SBC) system, a server, a desktop or laptop computer, a kiosk, a mainframe, a mesh of computer systems, a handheld mobile device, or combinations thereof.

The computing device 1000 may be a standalone device or part of a distributed system that spans multiple networks, locations, machines, or combinations thereof. In some embodiments, the computing device 1000 operates as a server computer (e.g., relay server) or a client device (e.g., originating device, delegate device) in a client-server network environment, or as a peer machine in a peer-to-peer system. In some embodiments, the computing device 1000 may perform one or more steps of the disclosed embodiments in real-time, in near real-time, offline, by batch processing, or combinations thereof.

As shown, the computing device 1000 includes a bus 1002 operable to transfer data between hardware components. These components include a control 1004 (i.e., processing system), a network interface 1006, an Input/Output (I/O) system 1008, and a clock system 1010. The computing device 1000 may include other components not shown or further discussed for the sake of brevity. One having ordinary skill in the art will understand any hardware and software included but not shown in FIG. 10.

The control 1004 includes one or more processors 1012 (e.g., central processing units (CPUs), application specific integrated circuits (ASICs), and/or field programmable gate arrays (FPGAs)) and memory 1014 (which may include software 1016). The memory 1014 may include, for example, volatile memory such as random-access memory (RAM) and/or non-volatile memory such as read-only memory (ROM). The memory 1014 can be local, remote, or distributed.

A software program (e.g., software 1016), when referred to as "implemented in a computer-readable storage medium," includes computer-readable instructions stored in a memory (e.g., memory 1014). A processor (e.g., processor 1012) is "configured to execute a software program" when at least one value associated with the software program is stored in a register that is readable by the processor. In some embodiments, routines executed to implement the disclosed embodiments may be implemented as part of operating system (OS) software (e.g., MICROSOFT WINDOWS, LINUX) or a specific software application, component, program, object, module or sequence of instructions referred to as "computer programs."

As such, the computer programs typically comprise one or more instructions set at various times in various memory devices of a computer (e.g., computing device 1000) and which, when read and executed by at least one processor (e.g., processor 1012), cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 1014).

The network interface 1006 may include a modem or other interfaces (not shown) for coupling the computing device 1000 to other computers, for example, over the network 1024. The I/O system 1008 may operate to control various I/O devices, including peripheral devices such as a display system 1018 (e.g., a monitor or touch-sensitive display) and one or more input devices 1020 (e.g., a keyboard and/or pointing device). Other I/O devices 1022 may include, for example, a disk drive, printer, scanner, or the like. Lastly, the clock system 1010 controls a timer for use by the disclosed embodiments.

Operation of a memory device (e.g., memory 1014), such as a change in state from a binary one to a binary zero (or vice versa) may comprise a visually perceptible physical transformation. The transformation may comprise a physical transformation of an article to a different state or thing. For example, a change in state may involve accumulation and storage of charge or release of stored charge. Likewise, a change of state may comprise a physical change or transformation in magnetic orientation, or a physical change or transformation in molecular structure, such as from crystalline to amorphous or vice versa.

Figure 11:
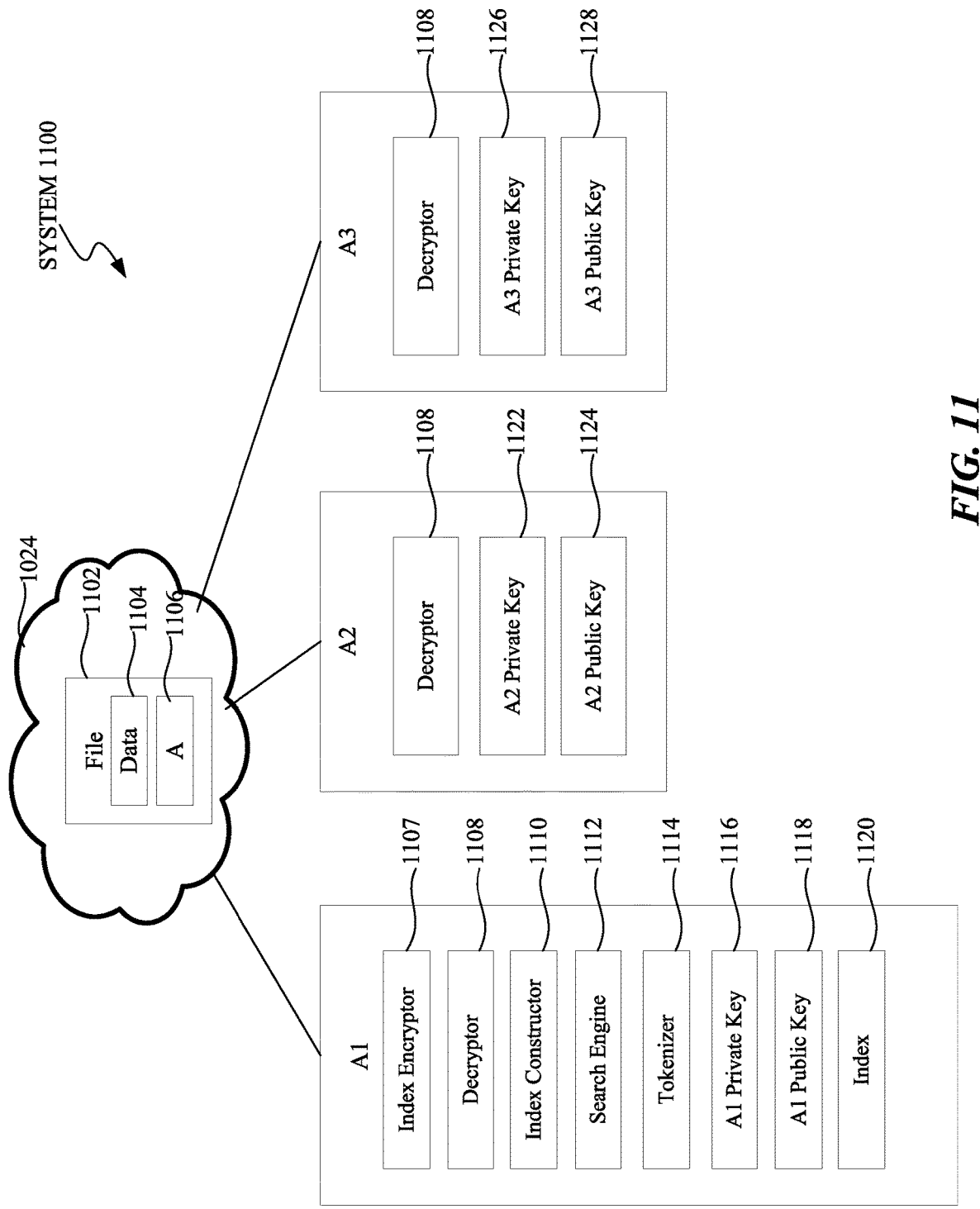
FIG. 11 is a block diagram of a system operable to implement aspects of the disclosed embodiments.

FIG. 11 is a block diagram of a system 1100 operable to implement aspects of the disclosed embodiments. The system 1100 comprises an originating (or heavy) device A1 and delegation devices A2 and A3, all communicatively coupled via the network 1024. While only three devices are shown, the system 1100 may include fewer or additional devices. Device A1 includes an Index Encryptor 1107, a decryptor 1108, an index constructor 1100, a search engine 1112, a tokenizer 1114, A1 private (symmetric) key 1116, A1 public key 1118 and at least one encrypted index 1120. A2 and A3 each include pairs of keys (symmetric private key and public key) 1122, 1124, 1126, and 1128 respectively. A file 1102 to be searched may be located on the network 1024 or otherwise accessible to A1. The file 1102 may include encrypted key shards collectively referred to as A 1106 needed to decrypt encrypted data 1104 residing in the file 1102.

The system 1100 is an m of n threshold secure search protocol where a user initiates a search from a device (the "heavy device"), e.g., A1, with access to a set of secure indices 1120, which may be located on A1 or elsewhere that is accessible to A1. m of n devices are required and necessary to enable the search. Any combination of at least m devices may be used. "Light devices" (e.g., A2 and A3) may perform only cryptographic operations necessary to enable the search. Once the search is enabled, access to the secure indices 1120 is required to complete the search and obtain results. If the heavy device A1 is compromised at the time of the search event the attacker is learn only the results of the search and m of n devices must be compromised to gain non-public information about the indices.

The above makes the following assumptions about the state of a set of devices prior to a search:

A set of secure indices has been created as described below and are accessible on the heavy device The cryptographic key material used in Indexing has been securely distributed amongst the set of devices as described below.

The set of devices have obtained knowledge of each public key for all other devices in the set through secure channels (tamper and eavesdrop resistant, for ex. a QR code generated on a device and scanned by the others).

A security guarantee of the system 1100 is that an adversary must compromise m of n devices in order to gain any non-public information about the indices 1120 and that if the heavy device A1 performing a search is compromised at the time of the search then the adversary learns only the results of the search.

There is some nuance to the above. More specifically, in order for an adversary to gain information about the secure indices 1120 they must have access to the indices 1120 and be able to do one of the following:

Observe the results of a search on the heavy device. The results of a search are which secure indices contain which tokens of the search query (see Tokenization discussed below). In this scenario the adversary learns only the results of the search and no addition information is leaked.

Compromise m of n devices in such a manner as to obtain the private key (e.g., 1116, 1122, and/or 1126) of the devices. This allows the adversary to attack the secure indices 1120 efficiently from a single device and obtain partial contents in a trivial amount of time.

Compromise m of n devices such that the devices may be coerced to perform searches on behalf of the adversary. This allows the adversary to attack the indices inefficiently and obtain partial contents in a non-trivial amount of time.

An adversary with the ability to observe and tamper with the secure indices and with all communication on the heavy device learns no more than the results of a search. If an adversary retains full access to the secure indices then, after observing the results of a search, the adversary is unable to perform any sort of frequency analysis, differential analysis, etc., which would:

Leak bits of the cryptographic key used in indexing (see Indexing)

Allow the adversary to reveal unknown tokens in any secure index (e.g. reveal any tokens the adversary has not observed a search for)

If a light device is compromised and that device is later used in a search the adversary learns the tokens of the query that a user is searching for. The adversary learns nothing about searches prior or after the duration of the compromise.

Whether or not an adversary can gain information about the secure indices by compromising a light device depends on how many light devices the adversary can compromise and whether or not they have access to the indices.

Without access to the secure indices

So long as an adversary does not have access to the secure indices then any amount of light devices may be compromised without revealing any information about the contents of the indices. This includes an adversary's observation and tampering with of search requests and responses to and from the light devices.

With access to the secure indices

If an adversary is able to compromise m of n light devices or m−1 of n light devices plus the heavy device then they are able to obtain information about the secure indices as described below in "m of n Private Key Compromise" and "m of n Device Coercion Compromise".

m of n private Key Compromise is only relevant if the adversary has access to the secure indices 1120. If an adversary is able to compromise m of n devices such that they can obtain the private asymmetric key associated with the device then it is assumed they additionally have access to the Shamir shares of the individual secret keys associated with each secure index. They are then able to decrypt each Shamir share and interpolate the results into the index secret key. Using the index secret key the adversary cannot simply reveal the full contents of the index, but they may roll any token they wish and, using the index secret key, test that it's in the index. This allows a typical brute force attack on the index. The adversary may recovery all contents of lengths which are computationally feasible to brute force. The adversary may of course apply typical probabilistic choices of tokens longer than the possible brute force length (for ex. dictionary attacks). A token's likelihood of being revealed in an index is exactly its likelihood of being generated in the brute force and probabilistic guessing attacks leveraged. This is similar to an adversary trying to guess a password given a hash of the password. The main difference being that the password, if crafted securely, is not possible to brute force or generate using probabilistic methodologies.

m of n Device Coercion Compromise is only relevant if the adversary has access to the secure indices 1120. If an adversary is able to compromise m of n devices such that they can be coerced at any time to perform the operations necessary to enable a search then the adversary may perform typical brute force and probabilistic guessing attacks against the index. These are the same attacks in "m of n Private Key Compromise," however the possible brute force length is vastly shortened as the expense of a single search is orders of magnitude higher. With private key compromise the adversary is bounded by the processing and memory at their disposal. With device coercion the adversary is bounded by the round-trip time of the network or BLUETOOTH connection that brings the devices together. Additionally, the adversary is bounded by device availability. Even if they can coerce the light devices (e.g., A2 and A3) to perform the necessary cryptographic operations, it's expected that there will be significant periods of time (possibly most of the day) where the device is unavailable to respond. This expectation is derived from the properties of light devices. Light devices are expected to be mobile devices and, barring full compromise of the device (which would imply private key compromise), are only able to respond when the application on the device is active.

The heavy device A1 is responsible for Tokenization and Normalization using the tokenizer 1114; Index Construction with the Index Constructor 1110; Distributing secret key material on a per index basis with the Index Encryptor 1107; Issuing Search Requests, Interpolating Search Responses into "trapdoors" that can be tested against the secure indices, Query Building, Performing secure index lookups, and search result ranking with the Search Engine 1112.

The light devices may issue authorized Search Responses and provide access to the distributed key material of each index secret key. The distributed key material may be stored alternatively in the file 1102 and/or at A1.

Figure 12:
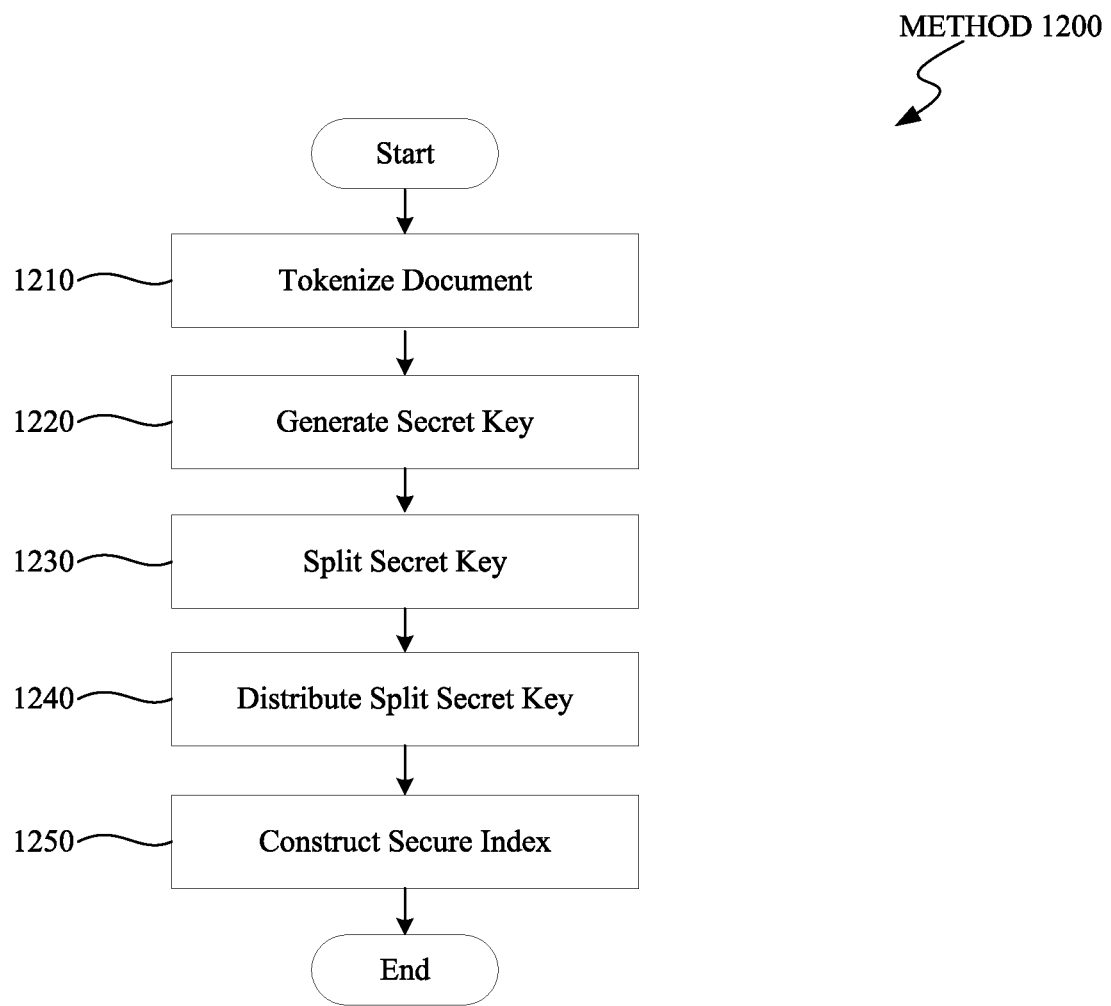
FIGS. 12 and 13 are flow diagrams illustrating a method of generating an index for use in searching encrypted files according to an embodiment.
Figure 13:
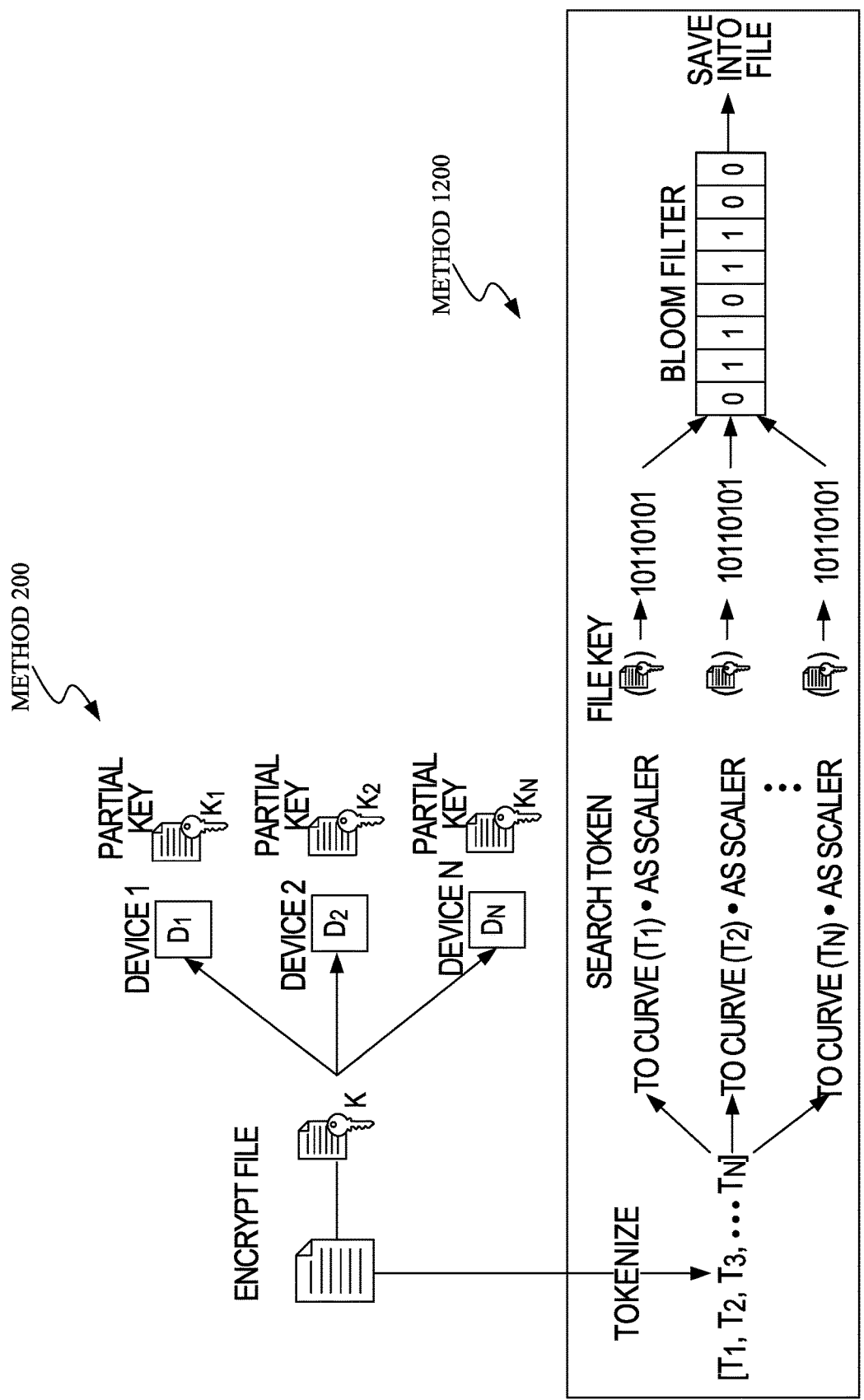

FIGS. 12 and 13 are flow diagrams illustrating a method 1200 of generating an index for use in searching encrypted files according to an embodiment. First, unencrypted data (document) is tokenized (1210) as will be discussed further below. A secret key is then generated (1220), split (1230), and distributed (1240). The secure index is constructed (1250) using the secret key.

More specifically, indexing takes place on the heavy device A1. At the time of indexing the contents of the document being indexed are assumed to be unencrypted. If the document is stored in an encrypted state then index creation must happen when the file is able to be decrypted as discussed in conjunction with FIG. 2 above. Indexing comprises: tokenizing the document, generating and distributing the secret key for the index and constructing the index using the tokens and the secret key. The index is stored accessible to the heavy device, e.g., A1.

Tokenization/Normalization

The tokenization process produces tokens of individual words primarily; for entities that may span normal word boundaries such as phone numbers; and ordered pairs of all other tokens, e.g. if a document has the following tokens: a, b, c, d, then the word pair tokens will be a b, b c, c d.

The tokens forms to look for include: IP addresses; Email addresses; URLs; NANP phone numbers; Times, e.g. 11:32;

Acronyms Any sequence of ., -, ', and alphanumerics, may also end in %—this covers: Wordlikes, Monetary or Decimal, and Percents.

Tokenization is a form of normalization in that it reduces all text corpora to the preceding forms. It can be inferred from the above that both "perfect" dog and perfect dog will tokenize to perfect dog (the quotation marks will be stripped).

Several of the above forms are normalized. For example, there are many ways to write the phone number 678.123.1234. All of them should normalize to the same string.

All normalization cases:
NANP phone numbers
URLs
  Urls should be easily searchable, so we remove the prefixes 'ftp://', 'http://' and 'www.'. Therefore http://www.google.com, www.google.com, google.com should all return the same result.
  Everything after the last '/' and between pairs of '/' that is greater than length 3 and not a stopword should be searchable. For ex. the url ftp://jaanfm.com/watch/JiyaJale.php would tokenize+normalize to jaanfm.com watch JiyaJale.php
  The length requirement of 3 contributes to 2 factors:
  1. Overextending result lists with unexpected documents from broken urls
  2. Overpadding a document's token list if a document comprises entirely of one url with man 'x/x/x'. This could lead to overblinding the index.
Apostrophes are removed (don't becomes dont)
dashes ("-") can normalize in two ways:
  if there is only 1 dash and the character count before the dash is less than 3 we remove the dash, e.g. re-make ->remake
  if the above is false we treat the dashes as spaces, e.g. government-owned ->government owned
Everything is lower-cased
Tokenization regex:

```
patt = re.compile(r"""
\b\d{1,3}\.\d{1,3}\.\d{1,3}\.\d{1,3}\b          # ip addresses
|\b[^\s@]{1,64}@[^\s@]{1,64}(?=\W|\b)           # email-ish
|\b(?:(?:https?|ftp)://|www\.)[^\s$.?#].[^\s]{0,128}(?=\W|\b)  # URL-ish
|\b[^\s/$.?#].[^\s]{0,64}(?:/[^\s]{1,128}){1,8}  # URL-ish, when no
http/ftp/www prefix, require /
|(?:\({,1}\d\d\d\){,1}[\s.\-]?){,1}\d\d\d[\s.\-]?\d\d\d\d\b    # NANP phone numbers
|\b\d{1,2}:\d\d\b                                # times, e.g. 11:32
|\b(?:[A-Za-z]\.){1,128}(?=\W|\b)               # acronyms
|\b\w{1,128}(?:[-'.]\w{1,64}){0,16}%{,1}        # word-ish, monetary,
percent, decimal
|\b[!?]{2,}\b                                    # ???, !!!
""", re.VERBOSE)
```

Stopwords are dropped from content queries but not filename queries. The list of stopwords:

["a", "an", "and", "are", "as", "at", "be", "but", "by", "for", "if", "in", "into", "is", "it", "no", "not", "of", "on", "or", "such", "that", "the", "their", "then", "there", "these", "they", "this", "to", "was", "will", "with"]

If the query contains only stopwords then the stopwords will not be dropped from content queries.

Secure Index Construction

The secure index of a document is constructed using the tokens of the document and the secret key for the document's index. "Trapdoors" are created using each token and the secret key. The trapdoors are used to create the index per Eu Jin Goh's Secure Indexes (Cryptology ePrint Archive: Report 2003/216), which is incorporated herein by reference.

An embodiment generates a trapdoor by hashing a token into an elliptic curve group and then performing a point multiplication of the result by the integer representation of the secret key. There are multiple methods for hashing arbitrary data into an elliptic curve group. Embodiments can use hash and increment, elligator, Shallue, van de Woestijne maps and/or others.

An embodiment could perform an exponentiation of the integer representation of the token by the secret key (token to the power of key). This would be an equivalently irreversible operation—the first requires solving the elliptic curve discrete log problem (ECDLP) and the second the discrete log problem (DLP). However, the field size of a standard shamir share is at least 3072 bits for requisite near-term security (equivalent to 128 bit symmetric). As $O(n*m)$ (n=num files, m=tokens in query) partial trapdoors must be computed on the light devices and transmitted back (see Searching) this is a massive space overhead. Exponentiation of large numbers is also quite expensive. By instead using the elliptic curve equivalent (point multiplication) with equivalent security (256 bit curve) the partial trapdoor values are much smaller (264 bites, the size of a compressed elliptic curve point). The computation is significantly less expensive as well. Additionally, factoring moduli grow much more than elliptic curves to achieve the same security. So to implement long-term 256 bit symmetric equivalent security a factoring module of 15360 bits would be needed which corresponds to a 512 bit elliptic curve group.

Secure indices can be IND-CKA secure (semantic security against adaptive chosen keyword attack). INK-CKA secure implies that an adversary with access to the index but not the secret key can gain no information about the contents of the index other than their total original size. It also means that if an adversary can observe searches they may still learn nothing outside the result of a search.

The index construction scheme is indifferent to the compression or encryption algorithms used on the document 1102.

The data structure of a secure index is a bloom filter. The bloom filter hash functions are pseudo random functions (PRFs) whose keys are derived from the index secret key. As we know the number of tokens up front for an index we can choose the size of the bloom filter and the corresponding number of PRFs to match our acceptable false positive rate of 1 in 1000 at the time of index generation.

At the time of file 1102 creation and/or update the index is rebuilt. A bloom filter is chosen according to the size of the document and the above error rate. Trapdoors are computed and inserted into the bloom filter. The bloom filter chosen size is a fixed percentage of the document size which includes enough space for the maximum possible tokens in the document. As nearly all documents will have fewer than the maximum amount of tokens the filter is finalized with a cryptographic blinding stage. The index is then stored in a memory device accessible to A1.

Figure 14:
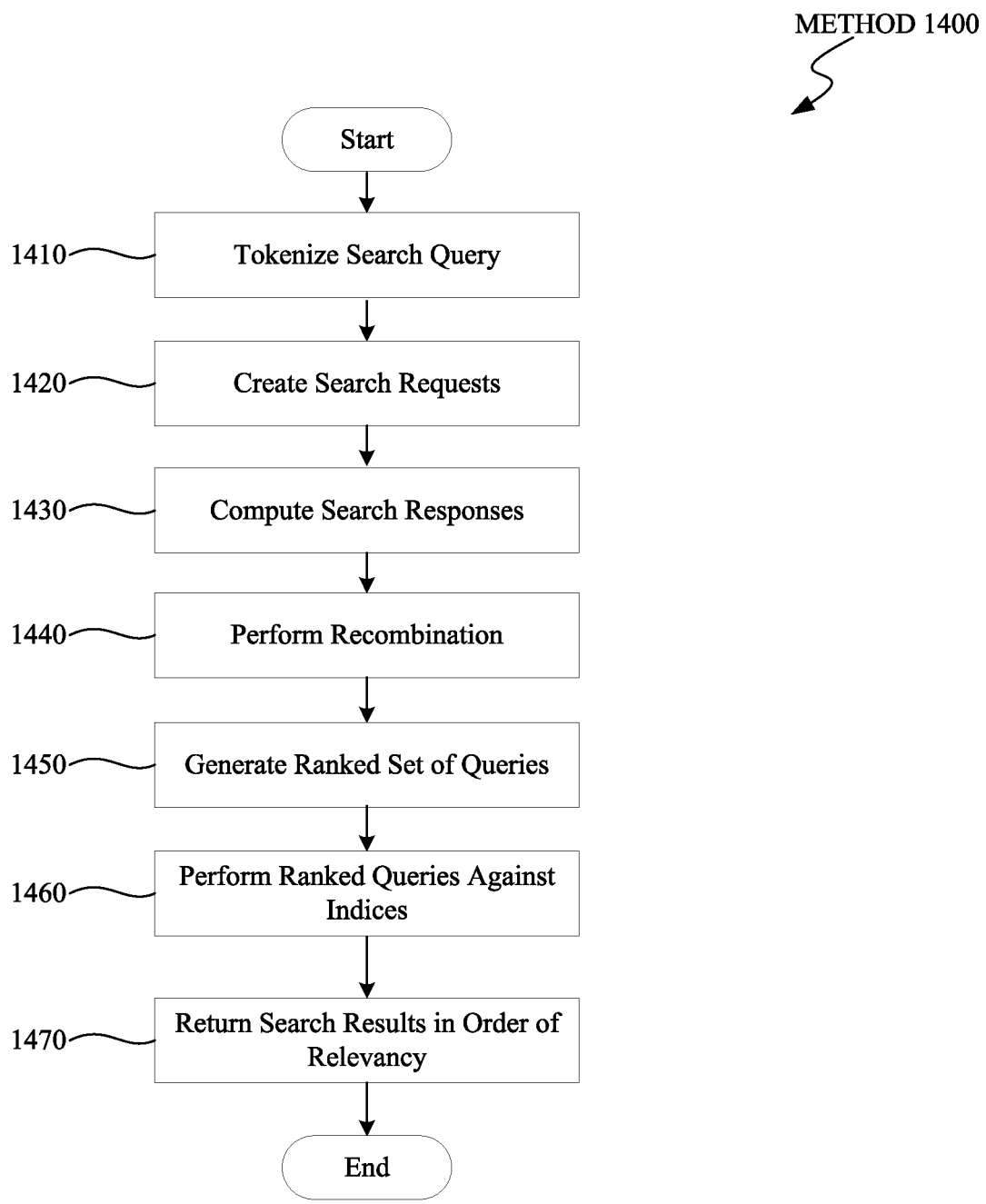
FIGS. 14 and 15 are flow diagrams illustrating a method of searching encrypted files using the generated index of FIGS. 12 and 13.
Figure 15:
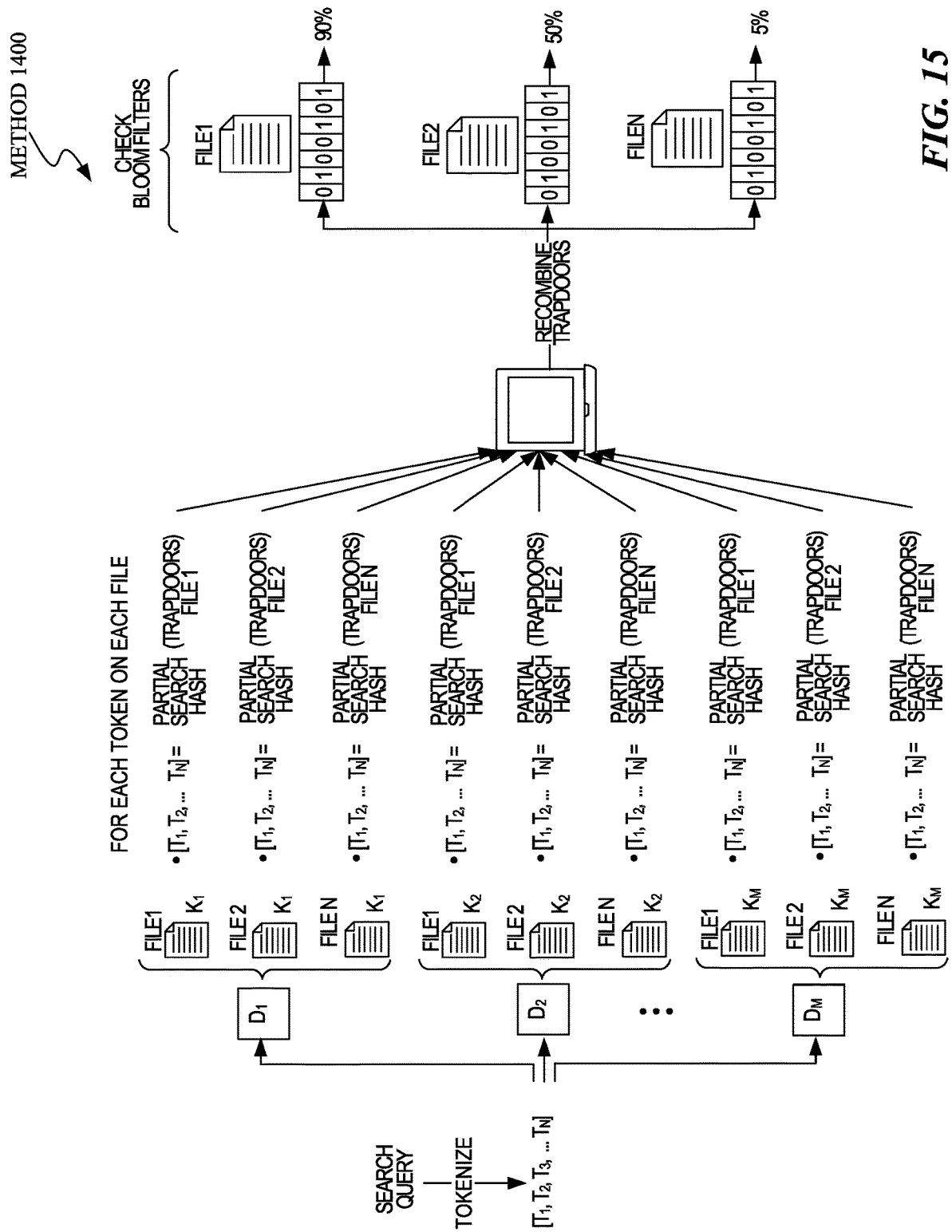

FIGS. 14 and 15 are flow diagrams illustrating a method 1400 of searching encrypted files using the generated index of FIGS. 12 and 13. First, a search query is tokenized (1410), search requests created (1420); compute (1430) search responses; perform (1440) recombination; generate (1450) ranked set of queries; perform (1460) ranked queries against indices; and return (1470) search results in order of relevancy. A user can then select a file from the search results and decrypt the file per FIG. 2.

More specifically, when a user wishes to determine which documents contain input text of their choosing (query) they perform a search. The search is effectively a threshold pseudorandom function (PRF) per token per document. A "threshold PRF" is a means of obtaining the results of a computation involving a secret value s using a threshold m of n participants. The threshold PRF can, for example, include "Distributed Pseudo-Random Function" by Christian Cachin published in Secure Distributed Computing, which is incorporated herein by reference. Because embodiments use secret sharing of each index secret key embodiments are able to compute this threshold PRF at the time of search to get the trapdoors per token per document using a threshold m of n devices.

The search process comprises:
  Tokenize the search query
  Create m−1 of n Search Requests and send to corresponding light devices
    A Search Request is a public key encrypted message containing the tokenized query and the document identifiers of the secure indices that will be searched
  m−1 of n light devices compute Search Responses and send them to the heavy device
    A Search Response comprises a partial trapdoor computed per token per document id. This partial trapdoor is computed by hashing each token into the elliptic curve group (see Trapdoor Generation in Secure Index Construction) and perform a point multiplication by the data of the Shamir share of the index secret key (see Key Generation and Distribution). This partial trapdoor is a modified Shamir share.
The heavy device performs a recombination event per document id (e.g. index) per token.
  The recombination event is an interpolation in the exponent of the modified Shamir shares. Note that most mathematical operations are homomorphic in Shamir space. This means that if we perform homomorphic compatible operations such as exponentiation by "e" on the original value "o" (o^e) before secret sharing, then secret share that value into secret shares "o_i", we can perform the same exponentiation on the secret shares (o_i^e) and then following an appropriate interpolation of the secret shares have the same result as original o^e.
  Following the recombination event embodiments now have the original trapdoors used in Secure Index Creation. Specifically, embodiments have a different set of trapdoors for each document index. Each set of trapdoors correspond to trapdoors of the tokens using that index's secret key. Those trapdoors can be tested for inclusion in the bloom filter. If the trapdoor is in the bloom filter, then the token used to create that trapdoor was in the original document.

The heavy device generates a ranked set of "queries" to perform against indices. These queries are distinct from the user's original text query. Each of these queries is a combination of trapdoors to be tested against each secure index. These queries happen in the order of most relevant to least relevant. (A query with all trapdoors would be the most relevant for example, and one of the least relevant would contain few trapdoors).

Search results are returned in order of relevancy
  Examples of the disclosed embodiments include:
    A method, comprising:
      tokenizing a document;
      generating an index key;
      sharding the index key;
      encrypting the index key shards with public keys of a plurality of devices;
      distributing the encrypted shards;
      constructing a secure index using the tokenized document and the key, the constructing comprising generating a trapdoor by hashing a token into an elliptic curve group and performing a point multiplication of the group by an integer representation of the index key; and
      storing the secure index in a memory device.
  2. The method of example 1, wherein the constructing further comprises inserting the trapdoor into a bloom filter.
  3. The method of example 2, further comprising finalizing the bloom filter with a cryptographic blinding stage.
  4. The method of example 2, wherein the bloom filter comprises hash functions that are pseudorandom functions with keys derived from index key.
  5. The method of example 1, wherein the sharding includes secret sharing.
  6. A method, comprising:
    tokenizing, at a first device, a search query;
    creating search requests and send to delegate devices, each search request including a public key encrypted message containing the tokenized search query and index identifiers of indices to be searched;
    computing search responses to the search requests, each search response comprising a partial trapdoor computed per token per identifier;
    transmitting the search responses to the first device;
    recombining, at the first device, the search responses per identifier per token;
    performing a ranked set of queries against the indices; and
    returning the search results in order of relevancy.
  7. The method of any of the preceding examples, wherein the partial trapdoor is computed by hashing each token into the elliptic curve group and performing a point multiplication by the data of a share of an index key.
  8. The method of any of the preceding examples, wherein the indices are created by:
    tokenizing a document;
    generating the index key;
    sharding the index key;
    encrypting the index key shards with public keys of the delegate devices;
    distributing the encrypted shards;
    constructing an index using the tokenized document and the key, the constructing comprising generating a trapdoor by hashing a token into an elliptic curve group and performing a point multiplication of the group by an integer representation of the index key; and storing the index in a memory device.

9. The method of any of the preceding examples, wherein the constructing further comprises inserting the trapdoor into a bloom filter.

10. The method of any of the preceding examples, further comprising finalizing the bloom filter with a cryptographic blinding stage.

11. The method of any of the preceding examples, wherein the bloom filter comprises hash functions that are pseudorandom functions with keys derived from index key.

12. The method of any of the preceding examples, wherein the sharding includes secret sharing.

13. The method of any of the preceding examples, further comprising receiving a user selection of a document from the returned search results and decrypting the user-selected document.

14. A computing device comprising:

a processor; and one or more memories that include instructions that, when executed by the processor, cause the computing device to:

tokenize, with the processor, a search query;

create search requests and send to delegate devices, each search request including a public key encrypted message containing the tokenized search query and index identifiers of indices to be searched;

cause the delegate devices to compute search responses to the search requests, each search response comprising a partial trapdoor computed per token per identifier;

cause the delegate devices to transmit the search responses to the processor;

recombine, with the processor, the search responses per identifier per token;

performing, with the processor, a ranked set of queries against the indices; and returning, with the processor, the search results in order of relevancy.

15. The computing device of any of the preceding examples, wherein the partial trapdoor is computed by hashing each token into the elliptic curve group and performing a point multiplication by the data of a share of an index key.

16. The computing device of any of the preceding examples, wherein the indices are created by:

tokenizing a document;

generating the index key;

sharding the index key;

encrypting the index key shards with public keys of the delegate devices;

distributing the encrypted shards;

constructing an index using the tokenized document and the key, the constructing comprising generating a trapdoor by hashing a token into an elliptic curve group and performing a point multiplication of the group by an integer representation of the index key; and storing the index in a memory device.

17. The computing device of any of the preceding examples, wherein the constructing further comprises inserting the trapdoor into a bloom filter.

18. The computing device of any of the preceding examples, wherein the instructions further cause a computer to finalize the bloom filter with a cryptographic blinding stage.

19. The computing device of any of the preceding examples, wherein the bloom filter comprises hash functions that are pseudorandom functions with keys derived from the index key.

20. The computing device of any of the preceding examples, wherein the sharding includes secret sharing.

21. The computing device of any of the preceding examples, further comprising receiving a user selection of a document from the returned search results and decrypting the user-selected document.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Aspects of the disclosed embodiments may be described in terms of algorithms and symbolic representations of operations on data bits stored on memory. These algorithmic descriptions and symbolic representations generally include a sequence of operations leading to a desired result. The operations require physical manipulations of physical quantities. Usually, though not necessarily, these quantities take the form of electrical or magnetic signals capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the claims disclosed herein. Thus, the description is to be regarded as illustrative instead of limiting.

What is claimed is:

1. A method, comprising:

tokenizing a document;

generating an index key;

constructing a secure index using the tokenized document and the key, the constructing comprising generating a trapdoor by hashing a token into an elliptic curve group and performing a point multiplication of the group by an integer representation of the index key; and storing the secure index in a memory device.

2. The method of claim 1, wherein the constructing further comprises inserting the trapdoor into a bloom filter.

3. The method of claim 2, further comprising finalizing the bloom filter with a cryptographic blinding stage.

4. The method of claim 2, wherein the bloom filter comprises hash functions that are pseudorandom functions with keys derived from the index key.

5. The method of claim 4, wherein the pseudorandom functions are chosen based on a prespecified desired false positive rate.

6. The method of claim 2, wherein the bloom filter is chosen as a function of a size of the document.

7. The method of claim 1, further comprising sharding the index key and distributing the shards, wherein the sharding includes secret sharing.

8. The method of claim 1, wherein the secure index provides semantic security against adaptive chosen keyword attack.

9. The method of claim 1, wherein the hashing is performed using one of hash and increment, elligator, Shallue, or van de Woestijne maps.

10. A non-transitory computer-readable medium having stored thereon instructions to cause at least one processor to execute a method, the method comprising:

tokenizing a document;

generating an index key;

constructing a secure index using the tokenized document and the key, the constructing comprising generating a trapdoor by hashing a token into an elliptic curve group and performing a point multiplication of the group by an integer representation of the index key; and storing the secure index in a memory device.

11. An apparatus, comprising:

at least one processor; and a non-transitory computer-readable medium having stored thereon instructions to cause the at least one processor to execute a method, the method comprising:

tokenizing a document;

generating an index key;

constructing a secure index using the tokenized document and the key, the constructing comprising generating a trapdoor by hashing a token into an elliptic curve group and performing a point multiplication of the group by an integer representation of the index key; and storing the secure index in a memory device.

12. The apparatus of claim 11, wherein the constructing further comprises inserting the trapdoor into a bloom filter.

13. The apparatus of claim 12, wherein the method further comprises finalizing the bloom filter with a cryptographic blinding stage.

14. The apparatus of claim 12, wherein the bloom filter comprises hash functions that are pseudorandom functions with keys derived from the index key.

15. The apparatus of claim 14, wherein the pseudorandom functions are chosen based on a prespecified desired false positive rate.

16. The apparatus of claim 12, wherein the bloom filter is chosen as a function of a size of the document.

17. The apparatus of claim 11, wherein the method further comprises sharding the index key and distributing the shards, wherein the sharding includes secret sharing.

18. The apparatus of claim 11, wherein the secure index provides semantic security against adaptive chosen keyword attack.

19. The apparatus of claim 11, wherein the hashing is performed using one of hash and increment, elligator, Shallue, or van de Woestijne maps.

\* \* \* \* \*